US012558662B2

(12) United States Patent
Hu et al.

(10) Patent No.: US 12,558,662 B2
(45) Date of Patent: Feb. 24, 2026

(54) HIGH-TEMPERATURE SHOCK HEATING FOR THERMOCHEMICAL REACTIONS

(71) Applicant: UNIVERSITY OF MARYLAND, COLLEGE PARK, College Park, MD (US)

(72) Inventors: Liangbing Hu, Potomac, MD (US); Dongxia Liu, Clarksville, MD (US); Yonggang Yao, College Park, MD (US); Qi Dong, Newton, MA (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 740 days.

(21) Appl. No.: 17/911,159

(22) PCT Filed: Mar. 12, 2021

(86) PCT No.: PCT/US2021/022204

§ 371 (c)(1),
(2) Date: Sep. 13, 2022

(87) PCT Pub. No.: WO2021/183949

PCT Pub. Date: Sep. 16, 2021

(65) Prior Publication Data

US 2023/0144856 A1 May 11, 2023

Related U.S. Application Data

(60) Provisional application No. 63/154,191, filed on Feb. 26, 2021, provisional application No. 62/989,110, filed on Mar. 13, 2020.

(51) Int. Cl.
*B01J 15/00* (2006.01)
*B01J 4/00* (2006.01)
(Continued)

(52) U.S. Cl.
CPC ............. *B01J 15/005* (2013.01); *B01J 4/008* (2013.01); *B01J 6/008* (2013.01); *B01J 19/0013* (2013.01);
(Continued)

(58) Field of Classification Search
CPC . B01J 15/005; B01J 4/008; B01J 6/008; B01J 19/0019; B01J 2204/005;
(Continued)

(56) References Cited

U.S. PATENT DOCUMENTS 1,639,272 A * 8/1927 Reed ..................... C01C 1/0417
422/148
1,880,306 A * 10/1932 Wulff ....................... B01J 38/12
585/539
(Continued)

FOREIGN PATENT DOCUMENTS

EP 0 289 391 A1 11/1988
WO WO 2018/069547 A1 4/2018
(Continued)

OTHER PUBLICATIONS

CN Office Action, issued Sep. 27, 2024 (Sep. 27, 2024), in Chinese Application No. 202180033111.0. (11 pages).
(Continued)

*Primary Examiner* — Lessanework Seifu
(74) *Attorney, Agent, or Firm* — RowanTree Law Group, PLLC; Frederick F. Rosenberger

(57) ABSTRACT

One or more reactants are flowed into thermal contact with a heating element in a reactor for a first time period. During a first part of a heating cycle, the one or more reactants are provided with a first temperature by heating with the heating element, such that one or more thermochemical reactions is initiated. The one or more thermochemical reactions includes pyrolysis, thermolysis, synthesis, hydrogenation,
(Continued)

dehydrogenation, hydrogenolysis, or any combination thereof. The first heating element operates by Joule heating and has a porous construction that allows gas to flow therethrough. During a second part of the heating cycle, the one or more reactants are provided with a second temperature less than the first temperature, for example, by de-energizing the heating element. A duration of the first time period is equal to or greater than a duration of the heating cycle, which is less than five seconds.

20 Claims, 12 Drawing Sheets

(51) Int. Cl.

| | |
|---|---|
| *B01J 6/00* | (2006.01) |
| *B01J 19/00* | (2006.01) |
| *B01J 19/24* | (2006.01) |
| *B29C 71/02* | (2006.01) |
| *C01B 3/26* | (2006.01) |
| *C01C 1/04* | (2006.01) |
| *C08J 7/12* | (2006.01) |
| *C10G 15/08* | (2006.01) |
| *C10G 50/00* | (2006.01) |

(52) U.S. Cl.
CPC ............ *B01J 19/2475* (2013.01); *C01B 3/26* (2013.01); *C01C 1/0417* (2013.01); *C01C 1/0452* (2013.01); *C08J 7/08* (2013.01); *C08J 7/12* (2013.01); *C10G 15/08* (2013.01); *C10G 50/00* (2013.01); *B01J 2204/005* (2013.01); *B01J 2219/00058* (2013.01); *B01J 2219/00135* (2013.01); *C01B 2203/0277* (2013.01); *C01B 2203/085* (2013.01); *C01B 2203/1241* (2013.01)

(58) Field of Classification Search
CPC .. B01J 2219/00058; B01J 2219/00135; C10G 15/08; C10G 50/00; C10G 51/023; C10G 9/24; C10G 9/26
See application file for complete search history.

(56) References Cited

U.S. PATENT DOCUMENTS

| | | | | |
|---|---|---|---|---|
| 1,904,426 A | * | 4/1933 | Eisenhut .................... | C07C 2/80 |
| | | | | 204/171 |
| RE19,794 E | * | 12/1935 | Banck ........................ | C07C 2/76 |
| | | | | 585/539 |
| 2,236,534 A | | 4/1941 | Leonard | |
| 2,920,123 A | * | 1/1960 | Oldershaw ................ | C07C 2/76 |
| | | | | 208/48 R |
| 3,202,664 A | * | 8/1965 | Brooks ................ | C07D 213/06 |
| | | | | 585/920 |
| 6,986,870 B1 | | 1/2006 | Brandenburg | |
| 10,525,407 B2 | | 1/2020 | Wachsman et al. | |
| 2010/0137663 A1 | | 6/2010 | Chen et al. | |
| 2011/0051961 A1 | | 3/2011 | Jiang et al. | |
| 2015/0129805 A1 | * | 5/2015 | Karpenko .............. | B01J 23/892 |
| | | | | 252/373 |
| 2019/0161840 A1 | | 5/2019 | Yao et al. | |
| 2021/0379549 A1 | | 12/2021 | Liu et al. | |

FOREIGN PATENT DOCUMENTS

| | | | |
|---|---|---|---|
| WO | WO 2020/236767 A1 | 11/2020 | |
| WO | WO 2020/252435 A1 | 12/2020 | |

OTHER PUBLICATIONS

EP Office Action, issued Feb. 29, 2024 (Feb. 29, 2024), in European Application No. 21767795.4. (7 pages).

CN Office Action, issued May 15, 2025 (May 15, 2025), in Chinese Application No. 202180033111.0. (10 pages).

Dou et al., "Enhancing $CO_2$ methanation over a metal foam structured catalyst by electric internal heating," *Chem. Commun.*, 2020, 56: pp. 205-208. (4 pages).

Harrington, R. "'Thermal shock' technique could transform mixed plastics recycling," *News & Analysis on the Bakery and Snacks Industry* [online]. Mar. 2017 [retrieved on Sep. 9, 2022]. Retrieved from the Internet: <URL:https://www.bakeryandsnacks.com/Article/2010/12/21/Thermal-shock-technique-could-transform-mixed-plastics-recycling>. (2 pages).

Hidaka et al., "High temperature pyrolysis of methane in shock waves. Rates for dissociative recombination reactions of methyl radicals and for propyne formation reaction," *International Journal of Chemical Kinetics*, 1990, 22: pp. 701-709. (9 pages).

International Search Report and Written Opinion, mailed Jul. 28, 2021, in International Application No. PCT/US2021/022204. (16 pages).

Kozlov et al., "Single-pulse shock tube studies on the kinetics of the thermal decomposition of methane," *Combustion and Flame*, Dec. 6, 1962, : pp. 253-263. (11 pages).

Luong et al., "Gram-scale bottom-up flash graphene synthesis," *Nature*, Jan. 2020, 577: pp. 647-651. (7 pages).

Miandad et al., "Catalytic Pyrolysis of Plastic Waste: Moving Toward Pyrolysis Based Biorefineries," *Frontiers in Energy Research*, Mar. 2019, 7(27): pp. 1-17. (17 pages).

Mimura et al., "Shock reaction of hexane at 77, 193, and 273K with special reference to shock pressure," *Shock Waves*, 1998, 8: pp. 311-319. (9 pages).

Mimura et al., "Shock-induced dehydrogenation of polycyclic aromatic hydrocarbons with or without serpentine: Implications for planetary accretion," *Earth and Planetary Science Letters*, 2005, 232: pp. 143-156. (14 pages).

Mimura, K., "Synthesis of polycyclic aromatic hydrocarbons from benzene by impact shock: Its reaction mechanism and cosmochemical significance," *Geochimica et Cosmochimica Acta*, 1995, 59(3): pp. 579-591. (13 pages).

Oh et al., "Direct non-oxidative methane conversion in a millisecond catalytic wall reactor," *Angewandte Chemie-International Edition*, 2019, 58(21): pp. 7083-7086. (21 pages).

Tsang, W., "Thermal decomposition of 2,3-dimethylbutane in a single-pulse shock tube," *The Journal of Chemical Physics*, Jul. 1965, 43(2): pp. 352-359. (8 pages).

Wismann et al., "Electrified methane reforming: A compact approach to greener industrial hydrogen production," *Science*, May 2019, 364: pp. 756-759. (4 pages).

Yang et al., "Rapid Laser Pulse Synthesis of Supported Metal Nanoclusters with Kinetically Tunable Size and Surface Density for Electrocatalytic Hydrogen Evolution," *ACS Applied Nano Materials*, 2020, 3: pp. 2959-2968. (10 pages).

Yao et al., "Carbothermal shock synthesis of high-entropy-alloy nanoparticles," *Science*, Mar. 2018, 359: pp. 1489-1494. (123 pages).

Yao et al., "High temperature shockwave stabilized single atoms," *Nature Nanotechnology*, Aug. 2019, 14: pp. 851-857. (8 pages).

Yao et al., "The Pyrolysis Property of a Pulsed Plasma of Methane," *Plasma Chemistry and Plasma Processing*, Dec. 2021, 21(4): pp. 651-663. (13 pages).

EP Office Action, issued Sep. 2, 2025 (Sep. 2, 2025), in European Application No. 21767795.4. (4 pages).

* cited by examiner

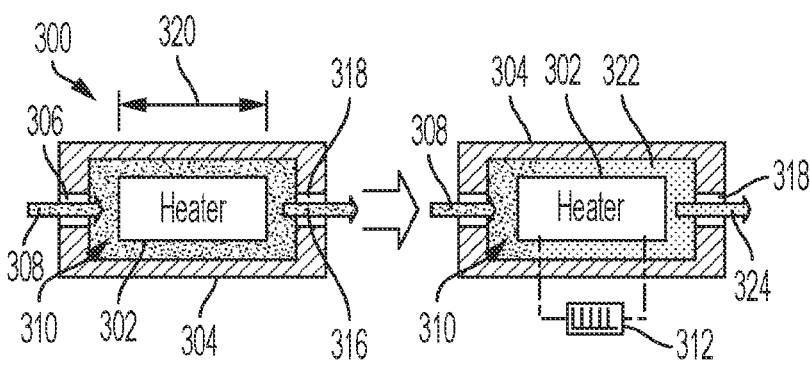
FIG. 3A
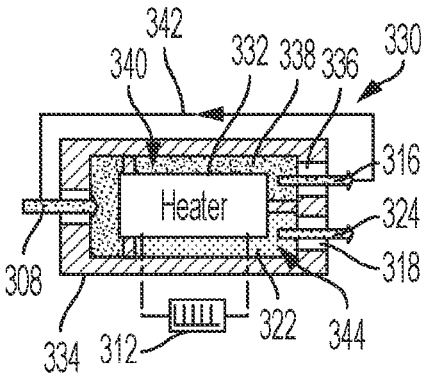
FIG. 3B
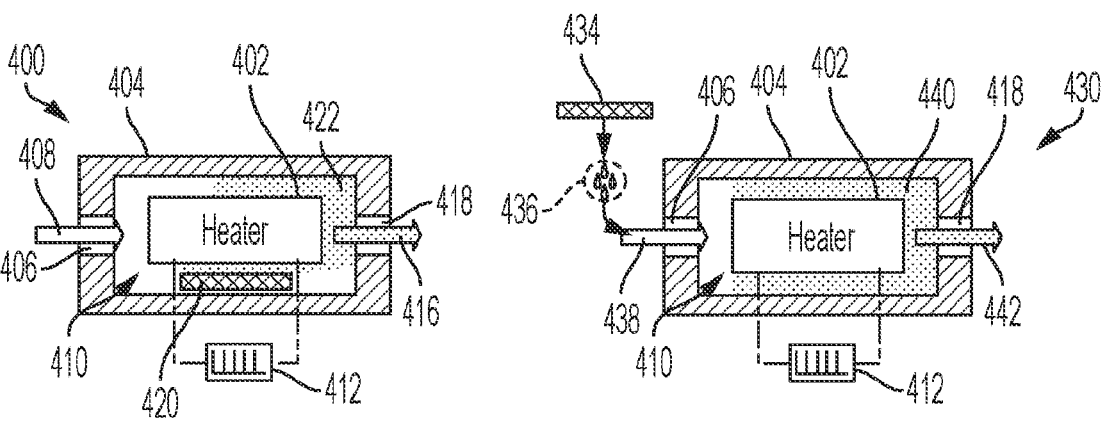
FIG. 4A                    FIG. 4B

HIGH-TEMPERATURE SHOCK HEATING FOR THERMOCHEMICAL REACTIONS

CROSS-REFERENCE TO RELATED APPLICATION

The present application claims the benefit of U.S. Provisional Application No. 62/989,110, filed Mar. 13, 2020, entitled "System and Method for High-Temperature Shock Heating for Thermochemical Reactions," and U.S. Provisional Application No. 63/154,191, filed Feb. 26, 2021, entitled "System, Device, and Method for High-Temperature Shock Heating for Thermochemical Reactions," each of which is incorporated by reference herein in its entirety.

STATEMENT REGARDING FEDERALLY SPONSORED RESEARCH

This invention was made with government support under DE-FE0031877 awarded by the U.S. Department of Energy. The government has certain rights in the invention.

FIELD

The present disclosure relates generally to thermochemical reactions, and more particularly, high-temperature Joule-based heating for thermochemical reactions, such as pyrolysis, thermolysis, synthesis, hydrogenation, dehydrogenation, hydrogenolysis, or combinations thereof.

BACKGROUND

Conventional thermochemical reactions are typically conducted by continuous heating under near-equilibrium conditions, in part because conventional heating devices exhibit poor heat transfer and large thermal inertia. As a result, many of the reaction schemes currently employed in industrial-scale chemical production systems suffer from low yield with respect to desired products due to the constraints of chemical equilibrium. For example, selective methane ($CH_4$) transformation to value-added products remains difficult to achieve. Similar to other thermochemical reactions, conventional methane conversion methods, such as steam reforming, dry reforming, direct non-oxidative methane conversion (DNMC), oxidative coupling, partial oxidation, and methane pyrolysis, are all conducted with continuous heating at a relatively mild temperature (e.g., <1300 K), which limits conversion. While higher temperatures are preferred for higher methane conversion in view of the endothermic nature of these transformations, such higher temperatures cause secondary and subsequent reactions that skew product yield toward undesired low-value products, such as heavy aromatics and coke, thereby reducing selectivity, conversion, or both. Achieving high yield and high selectivity to value-added products through methane conversion remains an unmet challenge.

In another example, ammonia ($NH_3$) synthesis ($N_2 + 3H_2 \rightarrow 2NH_3$, $\Delta H = -91.8$ KJ/mol) is typically conducted at a constant temperature under high pressure (e.g., ~200 bar). While a higher temperature may be preferred to provide the activation energy to break $N_2$ bonds, thermodynamically the synthesis reaction is not favored at such higher temperatures because of the exothermic nature of the reaction, which would otherwise shift the reaction equilibrium to ammonia decomposition at the higher temperatures. Accordingly, conventional ammonia synthesis methods require a compromise between reaction kinetics (e.g., where a higher temperature is desired for $N_2$ activation) and thermodynamics (e.g., where a lower temperature is desired due to the exothermic nature of the synthesis reaction) by adopting a mid-range temperature (e.g., ~500° C.) and associated reduced reaction rate.

Embodiments of the disclosed subject matter may address one or more of the above-noted problems and disadvantages, among other things.

SUMMARY

Embodiments of the disclosed subject matter provide gas-flow reactor systems and methods for high-temperature shock heating to conduct thermochemical reactions under non-equilibrium conditions with kinetic control over the mechanistic reaction process. Such thermochemical reactions can include pyrolysis, thermolysis, synthesis, hydrogenation, dehydrogenation, hydrogenolysis, or combinations thereof. As used herein, "shock heating" or "programmable heating and quenching" (PHQ) refers to rapid heating and quenching with tunable heating patterns (e.g., non-continuous or discontinuous heating) with time scales on the order of seconds or sub-seconds (e.g., milliseconds). The shock heating can employ a porous electrical Joule heating element within or part of a gas-flow reactor system. Compared with conventional steady-state approaches that operate with continuous heating at constant temperatures, embodiments of the disclosed subject matter provide rapid switching between low (e.g., 800 K to near room temperature) and high temperatures (e.g., 1200 K or above) in milliseconds or seconds. During the heating cycle, reactants (e.g., gases) are provided in thermal contact with the heating element by flowing into contact with and through pores of the heating element to enable efficient heat transfer therebetween. Accordingly, the temperature of the reactants closely follows the temperature profile of the heating element, thereby allowing for precise control of the reaction pathway under non-equilibrium conditions. With the disclosed shock heating approach, the high temperature applied during part of a heating cycle can enable bond activation while the chemical reaction is allowed to proceed during the low temperature part of the heating cycle, thereby decoupling thermodynamics and kinetics, and improving reaction rate and energy-efficiency.

In one or more embodiments, a method can comprise, for a first time period, providing one or more reactants in thermal contact with a first heating element in a reactor. The method can further comprise, during a first part of a heating cycle, providing the one or more reactants with a first temperature by heating with the first heating element, such that one or more thermochemical reactions is initiated. The method can also comprise, during a second part of the heating cycle, providing the one or more reactants with a second temperature less than the first temperature. A duration of the first time period can be equal to or greater than a duration of the heating cycle, and the duration of the heating cycle is less than five seconds. The first heating element can operate by Joule heating and can have a porous construction that allows gas to flow therethrough. The one or more thermochemical reactions can comprise pyrolysis, thermolysis, synthesis, hydrogenation, dehydrogenation, hydrogenolysis, or any combination thereof.

In one or more embodiments, a method can comprise, for a first time period, providing one or more reactants within a reactor. The method can further comprise, during the first time period, using one or more Joule heating elements to change a temperature of the one or more reactants between a first peak temperature and a first minimum temperature for a first heating cycle. The first peak temperature can initiate one or more thermochemical reactions of the one or more reactants. The one or more thermochemical reactions can comprise pyrolysis, thermolysis, synthesis, hydrogenation, dehydrogenation, hydrogenolysis, or any combination thereof. The method can also comprise, during the first time period, using the one or more Joule heating elements to change the temperature of the one or more reactants between a second peak temperature and a second minimum temperature for a second heating cycle. The second peak temperature can also initiate the one or more thermochemical reactions of the one or more reactants. A duration of the first time period can be equal to or greater than a combined duration of the first and second heating cycles, and the duration of each of the first heating cycle and the second heating cycle can be less than five seconds. A difference between the first peak temperature and the first minimum temperature can be at least 600 K, and a difference between the second peak temperature and the second minimum temperature can be at least 600 K.

In one or more embodiments, a thermochemical reaction system can comprise a gas-flow reactor, a Joule heating element, and a control system. The gas-flow reactor can have an inlet port and an outlet port. The inlet port can be constructed to receive input of a gas flow to an internal volume of the gas-flow reactor. The outlet port can be constructed to receive output of a gas flow from the internal volume of the gas-flow reactor. The Joule heating element can be disposed within the gas-flow reactor. The Joule heating element can have a porous construction that allows gas to flow therethrough. The control system can be operatively coupled to the Joule heating element and can be configured to apply a signal to the Joule heating element that changes temperature thereof between a peak temperature and a minimum temperature during a corresponding heating cycle. A duration of the heating cycle can be less than five seconds, a difference between the peak temperature and the minimum temperature can be at least 600 K, and the peak temperature can be at least 1200 K.

In one or more embodiments, a thermochemical reaction system can comprise an array of membrane reactors, an outer conduit, and electrical connections to each of the array of membrane reactors. The array of membrane reactors can be arranged in parallel within the outer conduit. Each membrane reactor can comprise a circumferential membrane wall that surrounds an internal flow volume. The circumferential membrane wall can be constructed to allow a first gas from the internal flow volume to pass therethrough while retaining a second gas within the internal flow volume. The outer conduit can define a product collection flow volume between outer circumferential surfaces of the membrane walls and an inner circumferential surface of the outer conduit. The electrical connections can be constructed to allow application of electrical power thereto, such that each membrane wall acts as a Joule heating element.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIG. 3A illustrates reactant flow initialization and heating stages in an exemplary continuous operation of a thermochemical reaction system, according to one or more embodiments of the disclosed subject matter.

FIG. 3B illustrates another exemplary continuous operation of a thermochemical reaction system employing reactant recirculation, according to one or more embodiments of the disclosed subject matter.

FIG. 4A illustrates an exemplary operation of a thermochemical reaction system for processing of preloaded solid or liquid reactants, according to one or more embodiments of the disclosed subject matter.

FIG. 4B illustrates an exemplary operation of thermochemical reaction system for processing of solid or liquid reactants in a gas flow, according to one or more embodiments of the disclosed subject matter.

DETAILED DESCRIPTION

General Considerations

Figure 1A:
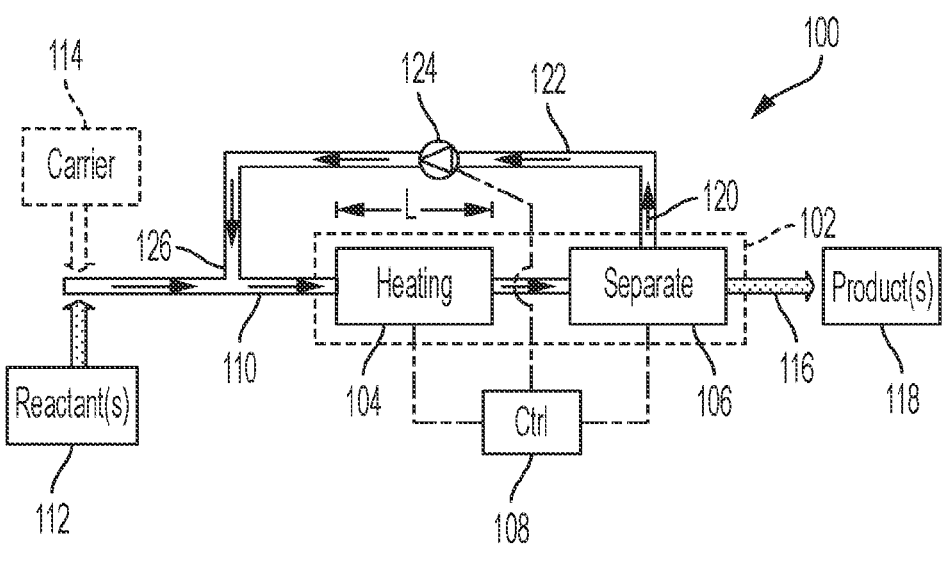
FIG. 1A is a simplified schematic diagram of a thermochemical reaction system, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Although dimensions, materials, and methods similar or equivalent to those described herein can be used in the practice or testing of the presently disclosed subject matter, suitable dimensions, materials, and methods are described below. The dimensions, materials, methods, and examples are illustrative only and not intended to be limiting. Features of the presently disclosed subject matter will be apparent from the following detailed description and the appended claims.

Introduction

Embodiments of the disclosed subject matter provide a programmable heating and quenching (PHQ) technique (also referred to as shock heating, pulse heating, non-continuous heating, or discontinuous heating) for conducting thermochemical reactions with a high selectivity, rate, and yield to value-added products at high energy efficiency. Thermochemical reactions can include, but are not limited to, one or more of pyrolysis, thermolysis, synthesis, hydrogenation, dehydrogenation, and hydrogenolysis. Embodiments of the disclosed subject matter can be applied to conduct other non-equilibrium thermochemical reactions that require high temperatures (e.g., >1000 K) for reaction initiation and where reactants, products, or both do not react with the heating element.

Unlike continuous heating under near-equilibrium conditions, the PHQ technique disclosed herein employs periodic or non-continuous heating on a second or sub-second scale to conduct non-equilibrium thermochemical reactions. In embodiments, a porous electrical heater (also referred to as a Joule heating element) is disposed such that gaseous reactants (or reactants supported in a gas flow) flow into contact with and through pores of the heater (e.g. in thermal contact with the heater) to enable efficient heat transfer therebetween. The direct contact between the gas-phase reactants and porous heating element can offer temporal tunability, spatial tunability, or both, with more complex temperature profiles (e.g., square wave, triangle wave, zoned heating, etc.) to accurately manipulate reaction pathways.

Driven by electrical energy, the PHQ technique may also enable process intensification and distributed chemical manufacturing with improved energy efficiency, which are currently unattainable by conventional thermochemical synthesis. Compared with conventional steady-state approaches that employ continuous heating at constant temperatures (e.g., less than 1300 K), the PHQ technique allow for rapid switching between a low temperature (e.g., 800 K or below) and a high temperature (e.g., 1200 K or above) in the second or sub-second regime simply by varying the electric current applied to the heater, in order to achieve non-equilibrium thermochemical reactions. In some embodiments, the high temperature offered by the PHQ technique can enable fast activation of reactants for high reaction rates (e.g., synthesis, conversion, etc.). The rapid quenching can provide high selectivity and good catalyst stability, as well as lowers the average reaction temperature to improve energy efficiency and reduce energy costs.

Generalized Thermochemical Reaction System

Embodiments of the disclosed subject matter further provide systems having a gas-flow reactor for conducting such thermochemical reactions. The porous electrical heating element can be disposed within or form a part of the gas-flow reactor. In general, the reactor system can include a source of one or more reactants and the heating element. Variations in system parameters can be made to accommodate different thermochemical reactions. Such variations can include, but are not limited to, heating process and pattern for the heating element (e.g., waveform, peak temperature and duration, minimum temperature and duration, heating cycle duration), reactor construction (e.g., flow path geometry, heating element geometry, materials for reactor and heating element, operation with or without catalysts), reaction configuration (e.g., reaction medium material, reactor temperature, flow rates, pressures), and reactant configuration (e.g., reactant types, reactant composition).

For example, FIG. 1A illustrates a generalized thermochemical reaction system 100 according to one or more embodiments of the disclosed subject matter. The reaction system 100 can have a reactor 102, a porous heating element 104, and a control system 108. In some embodiments, the reactor 102 is not pressurized during operation, such that thermochemical reactions proceeding therein occur at or near atmospheric pressure (e.g., ~1 bar). Alternatively, in some embodiments, the reactor 102 is pressurized during operation, for example, by being constructed as or being disposed in a pressure chamber. In such embodiments, the thermochemical reactions proceeding therein (e.g., hydrogenolysis, hydrogenation, synthesis, etc.) occur at an elevated pressure, such as 20 MPa (~200 bar).

The reactor 102 can define a flow path for gases provided to inlet 110 thereof to flow into thermal contact with the porous heating element 104. As used herein, thermal contact refers to a gas flowing into and through pores of the heating element 104 such that the temperature of the gas closely follows (e.g., within 10%) a temperature of the heating element 104. The duration of thermal contact (also referred to as residence time or first time period) between the heating element 104 and the gas may be based on a flow rate of the gas through the reactor 102 and a length, L, of the heating element 104 along the direction of flow. In some embodiments, the residence time of the reactant is selected such that the gas (e.g., a molecule in the gas flow) is exposed to multiple heating cycles of the heating element 104, as described in more detail below.

In some embodiments, the reactor 102 is constructed as a flow-through chamber, with a single inlet 110 for gaseous reactants 112 and/or carrier gas 114 flows, and at least one outlet 116 for gaseous products 118. Alternatively, in some embodiments, the reactor is provided with more than one inlet, more than one outlet, or both. For example, the reactor can be provided with a separate inlet for introduction of different reactants or carrier gases, or the reactor 102 can be provided with a second outlet 120 for removal of unreacted reactants, as discussed further below. In some embodiments, the reactor can also include separate ports or other structures to allow routing of electrical connections between the control system 108 and the heating element 104. Alternatively or additionally, in some embodiments, the electrical connections can be provided through the same inlet port and/or outlet port as the gas flows.

In some embodiments, for example, where at least one of the reactants is not in the gas phase, the reactor 102 can include a support structure disposed within the internal flow volume in close proximity (e.g., less than 1 cm) to the heating element 104 to hold solid or liquid reactants (e.g., biomass, polymers such as polyolefins or other plastics, etc.) for non-continuous heating by the heating element 104. Although such solid or liquid reactants are not in direct contact with the heating element 104, the close proximity allows the temperature of the reactants to closely follow the temperature of the heating element.

The porous heating element 104 is constructed to provide Joule heating based on electrical power (e.g., current) applied thereto. The heating element 104 can have a porosity or gas permeability tailored to a particular thermochemical reaction in order to allow reactants to flow therethrough. For example, in some embodiments, the heating element 104 can have a pore size of about 1 μm, a gas permeability of at 200 L/m³ at 200 Pa, or both. In some embodiments, the pore sizes of the heating element 104 can be characterized by imaging the pores in a portion of the heating element 104 or in an entirety thereof. For example, the pore sizes of the heating element 104 can be characterized by optical microscopy, electron microscopy (e.g., scanning electron microscopy), or X-ray micro-computed-tomography (micro-CT) imaging (e.g., American Society for Testing and Materials (ASTM) F2450-18, *Standard Guide for Assessing Microstructure of Polymeric Scaffolds for Use in Tissue-Engineered Medical Products*, ASTM International, West Conshohocken, PA, 2018, which is incorporated herein by reference). Alternatively or additionally, in some embodiments, the pore sizes of the heating element can be characterized by performing one or more porometry or porosimetry tests on the heating element. For example, the pore sizes can be characterized by capillary flow porometry, bubble point testing (e.g., ASTM F316-03 (2019) *Standard Test Methods for Pore Size Characteristics of Membrane Filters by Bubble Point and Mean Flow Pore Test*, ASTM International, West Conshohocken, PA, 2019, which is incorporated herein by reference), or mercury intrusion porosimetry (e.g., UOP578-11, *Automated Pore Volume and Pore Size Distribution of Porous Substances by Mercury Porosimetry*, ASTM International, West Conshohocken, PA, 2011, or U.S. Pharmacopeial Convention for Micromeritics and Particulate Systems Instruments <267>, *Porosimetry by Mercury Intrusion*, U.S. Pharmacopeial Convention, Rockville, MD, 2012, both of which are incorporated herein by reference).

The porous heating element 104 can be formed to have any two-dimensional (e.g., having a dimension at least 2 orders of magnitude less than orthogonal dimensions) or three-dimensional (3-D) shape, for example, planar, tubular, cylindrical, disk-shaped, as well as complex non-standard geometries. In some embodiments, multiple heating elements can be provided with the reactor. The multiple heating elements can be operated in series or in parallel, for example, to provide a longer residence time for reactants, to provide temporal or spatial variations in temperature, or for any other reason. The heating element 104 can be constructed of any material that has sufficient electrical resistivity (e.g., to achieve peak operating temperature for a given power input in a range of 500-3000 K), high temperature resistance (e.g., a melting temperature much greater than planned peak operating temperature), and low heat capacity (e.g., to enable rapid, sub-second heating and cooling rates in a range of $10^2$ K/s to $10^5$ K/s). For example, in some embodiments, the heating element 104 is constructed to provide a heating rate ($R_H$), cooling rate ($R_C$), or both of at least $10^3$ K/s (e.g., $\geq 10^4$ K/s). In some embodiments, the heating element 104 can be formed of pure carbon or a carbon-containing material, such as silicon carbide (SiC). For example, in some embodiments, the heating element 104 is composed only of carbon fibers, carbon felt, carbon nanotube fibers, carbon nanofibers, graphene, or combinations thereof.

In some embodiments, the reactor 102 is provided with a catalyst for the thermochemical reaction to be conducted therein. For example, the catalyst can be incorporated on or embedded within the heating element 104. Alternatively or additionally, the catalyst can be provided separate from the heating element 104, for example, as a flow conduit surface of the reactor. In some embodiments, the catalyst can be a single element or multi-elemental (e.g., binary, ternary, high-entropy, etc.). For example, the catalyst can comprise a metal (e.g., Ru, Fe, Ni, etc.) or alloys thereof, or any other known or later developed catalyst for a particular thermochemical reaction conducted by the reaction system 100. In some embodiments, the catalysts can be nanoparticles formed in situ within the heating element 104, for example, by using a high-temperature shock synthesis method, such as that described in U.S. Patent Application Publication No. 2019/0161840, which is incorporated by reference herein.

In some embodiments, the reactor 102 can optionally include a separator 106. For example, the separator 106 can be constructed to receive a flow of products and unreacted reactants from the heating element 104 and to isolate the products from the reactants. The unreacted reactants can then be directed via outlet 120 to a recirculating flow circuit 122 for reintroduction to the reactor inlet 110 for reprocessing. In some embodiments, the recirculating flow circuit 122 can optionally include a recirculating pump 124 for conveying the reactants between outlet 120 and union 126 (or valve or other fluid circuit feature to allow the reactant flow to be reintroduced to reactor 102).

In some embodiments, the separator 106 is a passive separation mechanism, for example, by being constructed as a size-selective filter membrane. In such embodiments, the pore size of the filter membrane can be selected to separate products from reactants (or vice versa), for example, based on the kinetic diameter of the respective molecules in the product and reactant flows. For example, in some embodiments, the pore size of the separator filter membrane can be microporous (e.g., <2 nm, such as ~0.3 nm for separation of ammonia product from $H_2$ and $N_2$ reactant gases). Alternatively or additionally, the separator 106 can employ an active separation mechanism, for example, by being constructed as ultrasonic-based gas separation device, such as that described in U.S. Pat. No. 8,231,707, issued Jul. 31, 2012, which is incorporated by reference herein. Although shown separately from heating element 104, in some embodiments, the functions of the heating element 104 and the separator 106 can be integrated together. For example, concurrently with provision of heating cycles, the heating element 104 may allow diffusion of products therethrough to a second flow path while retaining reactants to a first flow path in order to provide the desired separation. In such embodiments, the heating element 104 may be considered a membrane reactor.

Figure 1B:
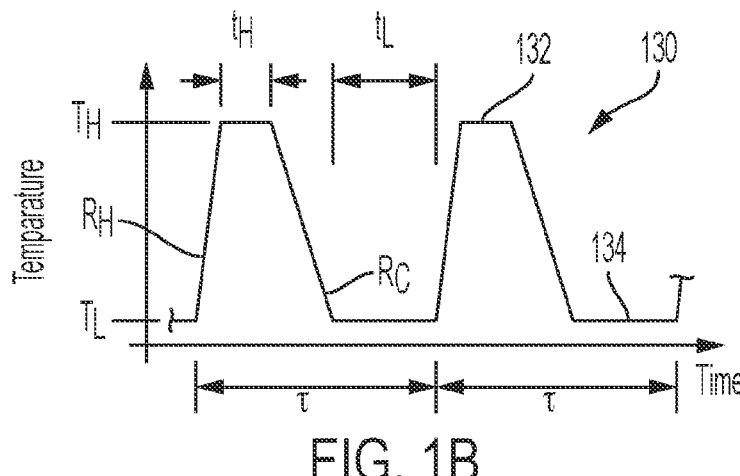
FIG. 1B is a graph depicting aspects of an exemplary non-continuous or discontinuous heating profile that can be employed in a thermochemical reaction system, according to one or more embodiments of the disclosed subject matter.

In operation of thermochemical reaction system 100, one or more reactant gases from source(s) 112 are provided to the inlet 110 of reactor 102, and the gases within the reactor are subjected to multiple heating cycles (e.g., each with its own peak temperature and minimum temperature) of the heating element 104 in either a continuous mode of operation (e.g., gas flow from the inlet 110, through the interior of the reactor 102, to the outlet 116 or 120 remains substantially constant or at least active during the multiple heating cycles) or batch mode of operation (e.g., gas flow into the inlet 110 and/or gas flow from outlets 116 and 120 is paused during one or more of the multiple heating cycles). For example, the residence time (e.g., the time period during which the reactants are in thermal contact with the heating element) for the reactants can be on the order of tens of seconds or minutes (or even greater), while the period of each heating cycle may be on the order of seconds (e.g., 5 seconds or less, such as ~1 second). Referring to FIG. 1B, an exemplary heating profile or waveform 130 for two heating cycles is shown. During each heating cycle, the reactants are subjected to a peak temperature, $T_H$, (e.g., at least 1000K, such as 1200 K or greater) for a first part 132 of the heating cycle and a lower quenching temperature, $T_L$, (e.g., no more than 800 K, at least 600 K less than the peak temperature, or both) for a second part 134 of the heating cycle. In some embodiments, the duration, $t_H$, of the first part 132 for peak temperature is less than the remainder of the heating cycle, for example, no more than 35% of the cycle period, $\tau$ (e.g., a first part of 10-400 millisecond duration (or 15-150 milliseconds) for a total cycle duration of 1-1.5 seconds). Conversely, the duration, $t_L$, of the second part 134 for quench temperature can constitute the majority of the heating cycle period, $\tau$.

Figure 1C:
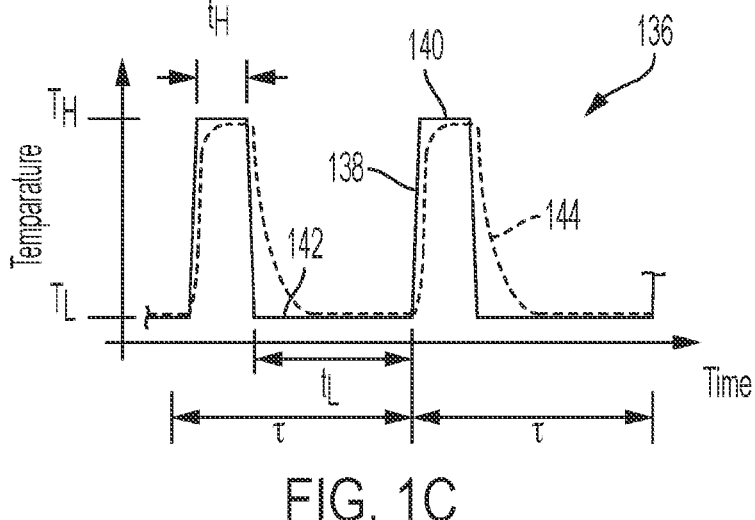
FIG. 1C is a graph of an exemplary pulse heating profile that can be employed in a thermochemical reaction system, according to one or more embodiments of the disclosed subject matter.

Although shown in idealized form in FIG. 1B, temperatures experienced in practical implementations of the disclosed reaction system 100 may deviate slightly from the idealized form. For example, FIG. 1C illustrates an example of a pulsed heating profile 136 for operating the heating element 104. While the waveform 138 of the applied electrical power follows the desired rectangular pulse configuration, with a first part 140 defining peak temperature and a second part 142 defining quench temperature, the actual temperature 144 generated by the heating element 104 deviates slightly therefrom, in particular by having a longer cooling rate due to slower cooling effect. Nevertheless, the system 100 is constructed such that the temperature of the gaseous reactants can be rapidly changed between a peak temperature and a minimum temperature in each heating cycle in the second or sub-second regime.

Figure 1D:
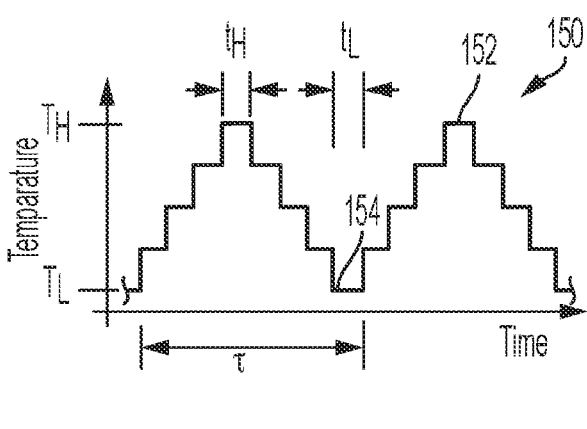
FIG. 1D is a graph of an exemplary stepped heating profile that can be employed in a thermochemical reaction system, according to one or more embodiments of the disclosed subject matter.

Although the discussion above and elsewhere herein focuses on pulsed heating, embodiments of the disclosed subject matter are not limited thereto. Rather, other waveforms are also possible according to one or more contemplated embodiments. For example, FIG. 1D illustrates a stepped heating profile 150. Similar to the above-described profiles, each cycle of the stepped heating waveform 150 has a first part 152 corresponding to the desired peak temperature and a second part 154 corresponding to the desired quench or minimum temperature. However, the waveform 150 also includes intermediate temperatures between the peak and minimum. The rapid heating/cooling rates offered by the disclosed heating elements can allow obtention of these multiple different temperature levels on the second or sub-second time scale. Such a waveform may be useful in multi-step thermochemical reactions, such as conversion of methane to higher carbon number compounds (e.g., $C_6H_6$), where the conversion step of each intermediate (e.g., $C_2$, $C_3$, $C_4$, $C_5$ species) may have different preferred peak temperatures for reaction activation.

Figure 1E:
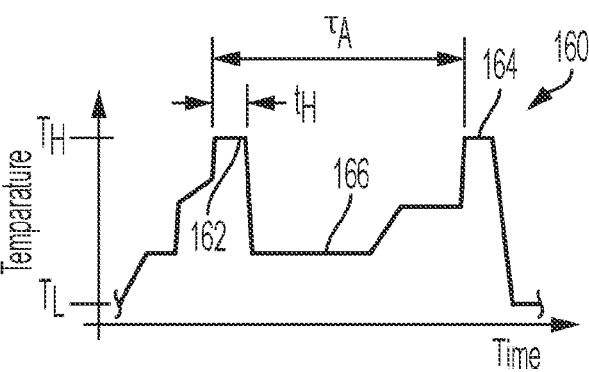
FIG. 1E is graph of an exemplary arbitrary heating profile that can be employed in a thermochemical reaction system, according to one or more embodiments of the disclosed subject matter.

While FIGS. 1B-1D describe the waveform for each cycle as being identical, embodiments of the disclosed subject matter are not limited thereto. Rather, more complex waveform patterns that are non-repeating are also possible. For example, FIG. 1E illustrates an arbitrary waveform 160. Although the waveform 160 is non-periodic (not repeating), a cycle period can be defined as the time between peak temperature applications, for example, between first peak application part 162 and second peak application part 164. Between the peak application parks 162, 164, at least one quench application part 166 is provided. Even with arbitrary waveforms such as waveform 160, the time between successive peak application parts is selected to be less than five seconds, such that each the time of each peak application is in the second or sub-second regime.

Returning to FIG. 1A, the control system 108 can be operatively coupled to the heating element 104 to control heating thereof. For example, in some embodiments, control system 108 can comprise a processor programmed to generate and/or apply electrical power signals to the heating element 104 to provide a desired shock heating profile to reactants within the reactor 102. Alternatively or additionally, control system 108 can comprise an electrical power supply and/or a signal generator (e.g., source meter or source measure unit with solid-state relay). In some embodiments, the control system 108 can comprise multiple components that each separately control elements of the reaction system 100, for example, a first controller for the heating element, a second controller for fluid circuit components, etc. In some embodiments, the control system 108 can also control operation of the separator 106, pump 124, or any other fluid circuit components such as pumps, valves, etc. within system 100.

For example, when the reactants 112 include methane ($CH_4$), the reactants can undergo a conversion/transformation reaction (e.g., pyrolysis) to generate products 118 such as $C_2$ hydrocarbons, aromatics, or both. For example, when the reactants 112 include ethane ($C_2H_6$), propane ($C_3H_8$), and/or higher hydrocarbons, the reactants can undergo a dehydrogenation reaction (e.g., pyrolysis) to generate products 118 such as other hydrocarbons, aromatics, or both. For example, when the reactants 112 include hydrocarbons, the reactants can undergo a dehydrogenation reaction (e.g., pyrolysis) to generate products 118 such as olefins and/or a hydrogenolysis reaction to generate products 118 such as other forms of hydrocarbons. For example, when the reactants 112 include hydrogen ($H_2$) and nitrogen ($N_2$), the reactants can undergo a synthesis reaction to generate products 118 such as ammonia ($NH_3$). For example, when the reactants 112 include methane ($CH_4$) and nitrogen ($N_2$), the reactants can undergo conversion/transformation (e.g., pyrolysis) and synthesis reactions to generate products 118 such as ammonia ($NH_3$), hydrocarbons, aromatics, or any combination thereof. For example, when the reactants 112 include methane ($CH_4$) and carbon dioxide ($CO_2$), the reactants can undergo conversion/transformation (e.g., pyrolysis) to generate products 118 such as synthesis gas (syngas). For example, when the reactants 112 include polymers (e.g., plastics such as polyolefin), the reactants can undergo conversion/transformation (e.g., pyrolysis) to generate products 118 such monomers, oligomers, hydrocarbons, aromatics, or any combination thereof. Thermochemical reactions other than those specifically described above are also possible according to one or more contemplated embodiments.

In some embodiments, one or more carrier gases from source(s) 114 can optionally be provided to the reactor 102 (e.g., via inlet 110). For example, the carrier gas can comprise hydrogen ($H_2$), nitrogen ($N_2$), or a noble gas (e.g., argon (Ar) or helium (He)). In some embodiments, the carrier gas can be supplied to a flowpath in the reactor separate from the reactants, for example, to act as a sweep gas to carry resulting products from the separator 106. Alternatively or additionally, in some embodiments, the carrier gas can also serve as a reactant as well as providing a carrying function. For example, solid or liquid reactant particles can be disposed within (e.g., via atomizer, aerosolizer, nebulizer, etc.) the carrier gas for transport to the heating element, whereby the heating therein initiates a thermochemical reaction between the particles (e.g., polymer particles) and the carrier gas (e.g., $H_2$).

Reactor Operation Examples

Figure 2:
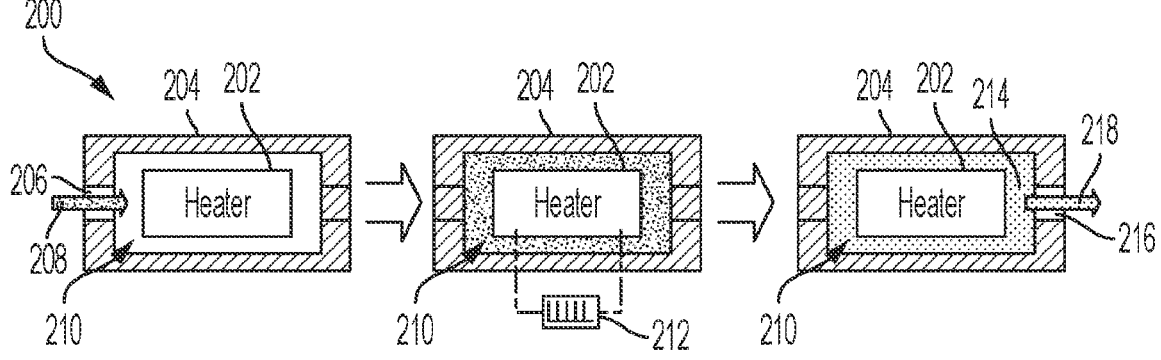
FIG. 2 illustrates reactant input, heating, and product output stages in an exemplary batch operation of a thermochemical reaction system, according to one or more embodiments of the disclosed subject matter.

FIG. 2 illustrates a thermochemical reaction system 200 operating in a batch mode. Thermochemical reaction system 200 includes a porous heating element 202 disposed in an internal volume 210 within reactor 204. In an input stage of the batch mode (left panel of FIG. 2), an inlet 206 of the reactor 204 is opened and one or more reactants gases 208 flow into the internal volume 210, such that the reactant gases 208 are in thermal contact with the heating element 202. The inlet 206 is then closed to seal the reactant gases 208 within the reactor 204. In a heating stage of the batch mode (center panel of FIG. 2), multiple cycles of a non-continuous heating profile 212 are applied to the heating element by a control system to cause corresponding heating thereof. The peak temperature part of each heating cycle initiates thermochemical reaction of the reactant gases 208 in thermal contact with the heating element 202, which reaction proceeds under non-equilibrium conditions during the remaining part of each heating cycle to generate products 214. The system can transition to an output stage once all reactants within the internal volume 210 have been converted to products 214, after expiration of a predetermined time period, after a predetermined number of heating cycles, or according to any other criteria. In the output stage of the batch mode (right panel of FIG. 2), an outlet 216 of the reactor 204 is opened and one or more product gases 214 are removed via flow 218. In some embodiments, during the input stage, the output stage, or both, heating element may be active (e.g., undergoing heating cycles); however, in general, the heating element is inactive (e.g., completely de-energized, or at least not undergoing heating cycles) during the input and output stages.

FIG. 3A illustrates a thermochemical reaction system 300 operating in a continuous flow mode. Thermochemical reaction system 300 includes a porous heating element 302 disposed in an internal volume 310 within reactor 304. In an initial stage of the flow mode (left panel of FIG. 3), a flow 308 of one or more reactant gases is provided to open inlet 306 of the reactor 304, such that the one or more reactants gases 208 flow through the internal volume 310 and out of the reactor 304 via outlet 318 as flow 316. While within the internal volume 310, the reactants flow in thermal contact with the heating element 302 (e.g., contacting surfaces and through pores of the heating element) for a residence time based at least in part on the inlet flow rate, outlet flow rate, and heating element length 320 along the reactant flow path. The system 300 can transition to the heating stage (right panel of FIG. 3A), where multiple cycles of a non-continuous heating profile 312 are applied to the heating element by a control system to cause corresponding heating thereof. The peak temperature part of each heating cycle initiates thermochemical reaction of the reactant gases 308 in thermal contact with the heating element 302, which reaction proceeds under non-equilibrium conditions during the remaining part of each heating cycle to generate products 322, which are subsequently removed from the reactor 304 via flow 324 through outlet 318 in a substantially continuous manner.

In some embodiments, less than all of the reactants in the internal volume 310 may be converted to products, for example, due to insufficient residence time or other factors. Accordingly, in some embodiments, reactants can be separated from products and returned to the reactor for reprocessing. For example, FIG. 3B illustrates a thermochemical reaction system 330 operating in a continuous flow mode with recirculation. Similar to the system 300 of FIG. 3A, reactant gases are provided to reactor 334 via flow 308 through the inlet. The heating element 332 in system 330, however, is constructed to separate reactants and products into different flow paths within the reactor 334. For example, the heating element 332 can be constructed as a separate membrane, the pore size of which allows product molecules to pass through while retaining reactant molecules, or vice versa. While the heating element 332 performs the multiple heating cycles, the products can be simultaneously separated from the reactants into different flow streams. In the illustrated example of FIG. 3B, unreacted reactants 338 are separated to first flow path 340, and products 322 are separated to second flow path 344. Similar to FIG. 3A, the products 322 can be removed from flow path 344 via flow 324 through outlet 318 in a substantially continuous manner. Meanwhile, unreacted reactants can be removed from flow path 340 via outlet 336 and returned via recirculation flow circuit 342 to the inlet of the reactor 334 for reprocessing.

In some embodiments, one or more of the reactants may be in the form of a solid or liquid. In such embodiments, the reactant can be provided within the reactor, and gaseous products resulting from application of the non-continuous heating cycles of the heating element can be removed in a substantially continuous manner. For example, FIG. 4A illustrates a thermochemical reaction system 400 operating in continuous flow mode with preloaded solid or liquid reactants 420. Similar to system 300 of FIG. 3A, a gas flow 408 is provided to reactor 404 via inlet 406. In some embodiments, the gas flow 408 acts a carrier gas, to direct products evolving from the solid or liquid reactants 420 to the outlet port 418 for removal as flow 416. Alternatively or additionally, gas flow 408 is a reactant in the thermochemical reaction with reactants 420. The reactants 420 are loaded within the inner volume 410 proximal to porous heating element 402 (e.g., less than 1 cm). In some embodiments, the solid or liquid reactants 420 may be loaded on a thermally-stable holder, for example, comprised of one or more ceramic materials, such as $Al_2O_3$, $ZrO_2$, $SiO_2$, etc. or combinations thereof (e.g., mullite ($3Al_2O_3 \cdot 2SiO_2$ or $2Al_2O_3 \cdot SiO_2$)). Similar to system 300 of FIG. 3A, multiple cycles of a non-continuous heating profile 412 are applied to the heating element 402 by a control system to cause corresponding heating thereof. The peak temperature part of each heating cycle initiates thermochemical reaction of the preloaded reactants 420 (and/or any reactants in flow 408), which reaction proceeds under non-equilibrium conditions during the remaining part of each heating cycle to generate products 422. Such products 422 can be removed from the reactor 304 in a substantially continuous manner via flow 416 through outlet 418.

In some embodiments, rather than pre-loading the reactor with solid or liquid reactants, such reactants can be added to an inlet gas flow of carrier gas or co-reactant gas. For example, FIG. 4B illustrates a thermochemical reaction system 430 operating in a continuous flow mode with solid or liquid reactants 434. For example, the solid or liquid reactants 434 can be converted to particles 436 (e.g., via atomizer, aerosolizer, etc.) that are incorporated into and carried by inlet gas flow 438. Similar to system 400 of FIG. 4A, inlet gas flow 438 is introduced into internal volume 410 via inlet 406, where it flows into contact with and through porous heating element 402. In some embodiments, the gas flow 438 acts a carrier gas, to carry the reactant particles 436 through the reactor 404 and to direct products evolving from the solid or liquid reactants to the outlet port 418 for removal as flow 442. Alternatively or additionally, gas flow 438 is a reactant in the thermochemical reaction with reactant particles 436. Similar to system 400 of FIG. 4A, multiple cycles of a non-continuous heating profile 412 are applied to the heating element 402 by a control system to cause corresponding heating thereof. The peak temperature part of each heating cycle initiates thermochemical reaction of the reactant particles 436 (and/or any reactant gas in flow 438), which reaction proceeds under non-equilibrium conditions during the remaining part of each heating cycle to generate products 440. Such products 440 can be removed from the reactor 304 in a substantially continuous manner via flow 442 through outlet 418.

Method Examples

Figures 5A, 5B:
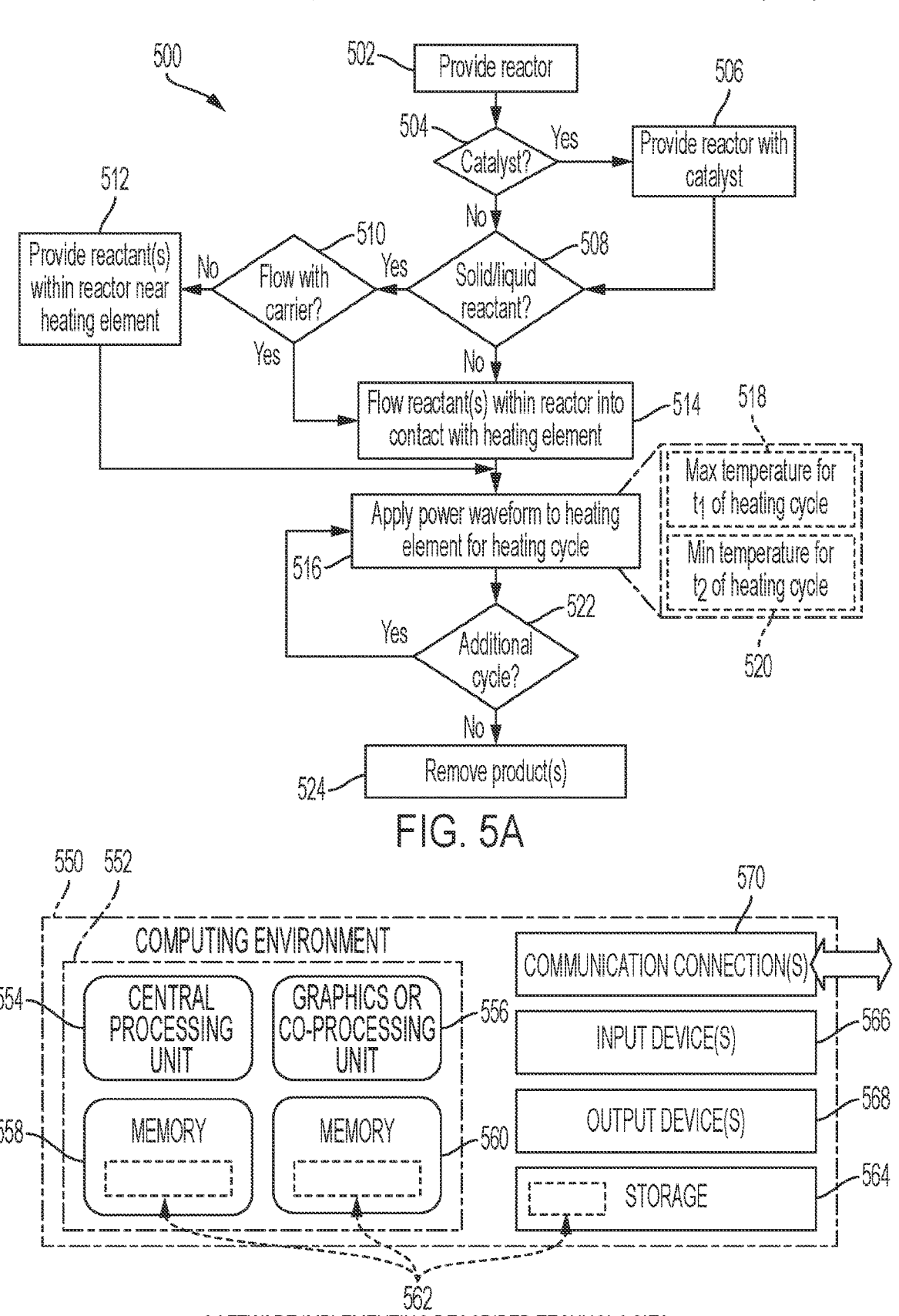
FIG. 5A is a process flow diagram of an exemplary thermochemical reaction method, according to one or more embodiments of the disclosed subject matter.
FIG. 5B is a simplified schematic diagram depicting a generalized example of a computing environment in which the disclosed technologies may be implemented.

FIG. 5A illustrates a method 500 for thermochemical reactions employing the PHQ (non-continuous heating) technique. The method 500 can initiate at process block 502, where a reactor of a thermochemical reaction system is provided. The reactor can have a structure according to any of the examples described herein. In some embodiments, the reactor can be provided with a separate heating element therein (or multiple heating elements). Alternatively, in some embodiments, the heating element can be constructed as a structural part of the reactor, for example, as a membrane reactor that separates products from reactants. Each heating element can be porous so as to be permeable with respect to the gases employed in the thermochemical reaction (e.g., reactants) and/or gases employed in the system (e.g., non-reacting carrier gases).

The method 500 can proceed to decision block 504, where it is determined if a catalyst is desired. For some thermochemical reactions, the use of the PHQ technique can result in efficient and effective chemical production even without any catalyst (e.g., metal catalysts) within the system. In such examples (e.g., methane pyrolysis), the method 500 can proceed directly to decision block 508 without otherwise providing a catalyst. Otherwise, if a catalyst is desired, the method 500 can proceed to process block 506, where the reactor is provided with an appropriate catalyst. In some embodiments, the catalyst can be provided within the reactor (e.g., an internal volume thereof, such as surfaces of a flow path) separate from the porous heating element. Alternatively or additionally, in some embodiments, the catalyst is provided on and/or integrated with the porous heating element. For example, the catalyst can be a metal catalyst (e.g., Ru, Fe, Ni, alloys thereof), a multi-elemental catalyst (e.g., binary, ternary, high-entropy, etc.), any other known or later developed catalyst, or combinations thereof. In embodiments where the catalyst is loaded in the heating element, the loading can be in the range of 0.5-40 wt % inclusive, for example, about 2 wt %. In some embodiments, the loading of the catalyst in the heating element comprises forming catalyst nanoparticles by a high-temperature shock synthesis method, such as that described in U.S. Patent Application Publication No. 2019/0161840, which is incorporated by reference herein. The method 500 can then proceed to decision block 508.

At decision block 508, the process flow can diverge based on the phase of the reactant used in the thermochemical reaction system. For example, for reactions where any of the reactants are solid or liquid (e.g., biomass or a polymer, such as plastic), the method 500 can proceed to decision block 510; otherwise, if all reactants are gases, the method can proceed directly to process block 514. At decision block 510, it is determined if a carrier gas is desired for flowing reactants. If a carrier gas is not desired for flowing reactants, the method 500 can proceed to process block 512, where the reactants are preloaded into the reactor. For example, the solid or liquid reactants (e.g., in particle form) can be loaded onto a support (e.g., formed of one or more ceramic materials) within the reactor. The support can position the reactants proximal to the heating element, for example, within 1 cm. Alternatively, solid or liquid reactants can be continuously supplied to a heating location within the reactor (e.g., within 1 cm of the heating element), for example, by a fluid pump, particle conveyor belt, or any other mechanical conveyance. For example, gravity can be used, together with surface features of the reactor, to channel particles added to the reactor at a location remote from the heating element to the heating region proximal the heating element. In some embodiments, a carrier gas is provided regardless of the decision made at decision block 510, for example, to transport products generated within the reactor to an outlet or to as a co-reactant (e.g., $H_2$ gas) with the solid/liquid reactants preloaded within the reactor.

At decision block 510, if it is determined that a carrier gas is desired for flowing solid or liquid reactants, the method 500 can proceed to process block 514, where the carrier gas is used to flow the reactants into the reactor and into thermal contact with the porous heating element therein. For example, the carrier gas can include hydrogen ($H_2$), nitrogen ($N_2$), a noble gas (e.g., helium, argon, etc.), or any combination thereof. If not already in such form, the method 500 can further include preparing the solid/liquid reactant in suitable form for inclusion in the carrier gas, for example, by forming into separate particles or droplets (e.g., by an aerosolizer, atomizer, nebulizer, etc.).

At process block 514, one or more reactants (e.g., either in gaseous form or particles carried by a carrier gas) are flowed into the reactor into thermal contact with the porous heating element. For example, reactants can include, but are not limited to, methane, ethane, propane, other hydrocarbons, hydrogen, nitrogen, carbon dioxide, polymer (e.g., plastics, such as polyolefin), biomass, or any combination thereof. In particular, the gas flow can be around and through the heating element via pores therein, such that the temperature of the flowing reactants in thermal contact with the heating element substantially matches the temperature of the heating element and will substantially follow temperature changes produced by the waveform applied to heating element during the heating cycle. The size of the heating element, gas flow rate, and heating cycle period are selected such that reactants remain in thermal contact with the heating element for residence time period (e.g., on the order of tens of seconds, minutes, or even hours) that exceeds a duration of each heating cycle (e.g., such that each reactant molecule in the gas flow experiences multiple heating cycles in a single pass through the reactor). In some embodiments, the flowing of process block 514 can also include flowing a carrier or sweep gas through the reactor with the reactant gas flow (e.g., in a same flow path or a different flow path as the reactant gas flow). For example, a sweep gas of hydrogen or a noble gas can be provided to a product isolated flow path (e.g., separated from a reactant flow path by a separator membrane) to flow the gaseous products out of the reactor.

The method 500 can proceed to process block 516, where the reactants in the reactor are heated for a single heating cycle by applying a predetermined waveform (e.g., current or power signal) to the porous heating element within the reactor. The heating in process block 516 is generally non-continuous and includes at least a first part 518, where a peak temperature (e.g., at least 1000 K, such as 1200 K or greater) is applied to the reactants for a duration $t_1$, and a second part 520, wherein a minimum or quench temperature (e.g., less than 800 K, such as 700 K or less) is applied to the reactants for a duration $t_2$. In some embodiments, the duration $t_1$ of the first part 518 is less than a remainder of the heating cycle in process block 516, for example, no more than 35% of the heating cycle duration (e.g., 10-400 milliseconds for a total cycle duration less than 5 seconds, for example, 1-1.5 seconds). In some embodiments, the duration $t_2$ of the second part 520 constitutes a majority of the heating cycle in process block 516, for example, at least 50% of the heating cycle duration. Although shown separately from process block 514, in some embodiments, process block 516 occurs concurrently with process block 514, such that heating occurs while reactants flow into and through the reactor. Alternatively, in some embodiments employing batch processing, the flowing of process block 514 can be stopped prior to initiating heating in process block 516.

The peak temperature generated in process block 516 can be effective to initiate (e.g., enable bond activation) one or more thermochemical reactions of the reactants in thermal contact with the porous heating element. The thermochemical reactions can include pyrolysis, thermolysis, synthesis, hydrogenation, dehydrogenation, hydrogenolysis, and/or any other non-equilibrium thermochemical reaction that requires high temperatures (e.g., >1000 K) for initiation and where reactants, products, or both do not react with the heating element. The provision of a quench temperature within the heating cycle of process block 516 can help tune selectivity for particular reaction products or alter reaction equilibrium. For example, in some embodiments, the heating cycle of process block 516 can yield high selectivity toward light hydrocarbon chemicals while limiting coke formation in $CH_4$ conversion. In some embodiments, the provision of a quench temperature within the heating cycle of process block 516 can help compensate for the exothermic nature of the initiated thermochemical reaction, which would otherwise elevate temperature beyond that controlled by heating element and lead to product decomposition. In some, the provision of a quench temperature within the heating cycle of process block 516 may also improve catalyst stability, and/or lower energy costs for product generation by reducing average temperature in the reactor.

The method 500 can proceed to decision block 522, where it is determined if additional heating cycles should be applied. In some embodiments, heating cycles can be repeated in a substantially continuous manner, for example, as long as reactants are provided as input to the reactor. However, even in batch operations, the heating can be repeated at least once and preferably multiple times, in order to subject reactants within the reactor to multiple heating cycles. If additional heating cycles are desired, the method 500 can return to process block 516 for repetition.

Otherwise, the method 500 can proceed to process block 524, where products generated by the thermochemical reactions in the reactor are removed for storage or use. Such products can include, but are not limited to, $C_2$ hydrocarbons, higher hydrocarbons, aromatics, ammonia, syngas, or combinations thereof. In some embodiments, the removal for process block 516 involves flowing a carrier or sweep gas to carry products within the reactor to an appropriate outlet. For example, as described above a sweep gas of hydrogen or a noble gas can be provided to a product-isolated flow path (e.g., separated from a reactant flow path by a separator membrane) to flow the gaseous products out of the reactor. Although shown separately from process block 516, in some embodiments, process block 524 occurs concurrently with process block 516, such that heating occurs while products flow out of the reactor. Alternatively, in some embodiments employing batch processing, the removing of process block 524 can occur after the heating in process block 516 is completed.

Although blocks 502-524 of method 500 have been separately illustrated in FIG. 5A, in some embodiments, blocks may be combined and performed together (simultaneously or sequentially). Moreover, although FIG. 5A illustrates a particular order for blocks 502-524 of method 500, embodiments of the disclosed subject matter are not limited thereto. Indeed, in certain embodiments, the blocks may occur in a different order than illustrated or simultaneously with other blocks. For example, the reactant flow of process block 514, non-continuous heating of process block 516, and product removal of process block 524 may all occur simultaneously in a continuously operating thermochemical reaction setup. Accordingly, embodiments of the disclosed subject matter are not limited to the specific order illustrated in FIG. 5A and described above.

FIG. 5B depicts a generalized example of a suitable computing environment 550 in which the described innovations may be implemented, such as control system 108, controller 212, controller 312, controller 412, method 500, controller 612, controller 712, controller 812, controller 832, controller 922, and/or a controller for system 1100. The computing environment 550 is not intended to suggest any limitation as to scope of use or functionality, as the innovations may be implemented in diverse general-purpose or special-purpose computing systems. For example, the computing environment 550 can be any of a variety of computing devices (e.g., desktop computer, laptop computer, server computer, tablet computer, etc.). In some embodiments, the computing environment is an integral part of a thermochemical reaction system or chemical processing system. Alternatively, in some embodiments, the computing environment is a separate system connected to the thermochemical reaction system or chemical processing system, for example, by making operative electrical connections (e.g., wired or wireless) to the thermochemical reaction system or chemical processing system, or components thereof.

With reference to FIG. 5B, the computing environment 550 includes one or more processing units 554, 556 and memory 558, 560. In FIG. 5B, this basic configuration 552 is included within a dashed line. The processing units 554, 556 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5B shows a central processing unit 554 as well as a graphics processing unit or co-processing unit 556. The tangible memory 558, 560 may be volatile memory (e.g., registers, cache, RAM), non-volatile memory (e.g., ROM, EEPROM, flash memory, etc.), or some combination of the two, accessible by the processing unit(s). The memory 558, 560 stores software 562 implementing one or more innovations described herein, in the form of computer-executable instructions suitable for execution by the processing unit(s).

A computing system may have additional features. For example, the computing environment 550 includes storage 564, one or more input devices 566, one or more output devices 568, and one or more communication connections 570. An interconnection mechanism (not shown) such as a bus, controller, or network interconnects the components of the computing environment 550. Typically, operating system software (not shown) provides an operating environment for other software executing in the computing environment 550, and coordinates activities of the components of the computing environment 550.

The tangible storage 564 may be removable or non-removable, and includes magnetic disks, magnetic tapes or cassettes, CD-ROMs, DVDs, or any other medium which can be used to store information in a non-transitory way, and which can be accessed within the computing environment 550. The storage 564 can store instructions for the software 562 implementing one or more innovations described herein.

The input device(s) 566 may be a touch input device such as a keyboard, mouse, pen, or trackball, a voice input device, a scanning device, or another device that provides input to the computing environment 550. The output device(s) 566 may be a display, printer, speaker, CD-writer, or another device that provides output from computing environment 550.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc.

can be by generation and transmission of an appropriate electrical signal by wired or wireless connections.

Heating Element Examples

Figures 6A, 6B, 6C, 6D:
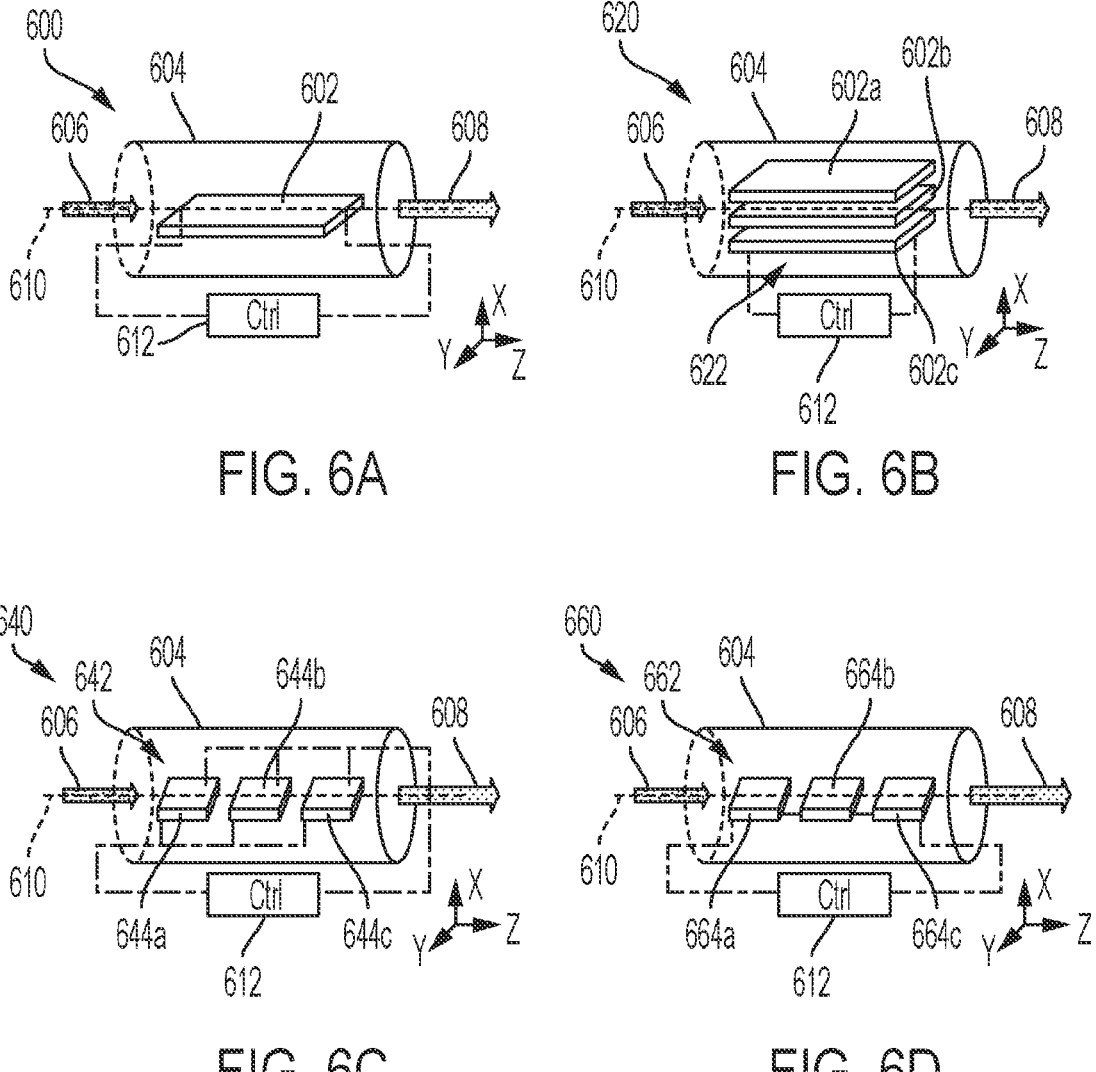
FIG. 6A illustrates an exemplary configuration for a heating element arranged parallel to reactant flow in a thermochemical reaction system, according to one or more embodiments of the disclosed subject matter.
FIG. 6B illustrates an exemplary variation of the configuration of FIG. 6A that employs employing multiple heating elements arranged parallel to each other.
FIG. 6C illustrates an exemplary variation of the configuration of FIG. 6A that employs multiple heating elements serially arranged with respect to reactant flow and electrically connected together in parallel.
FIG. 6D illustrates an exemplary variation of the configuration of FIG. 6C that employs multiple heating elements serially arranged with respect to reactant flow and electrically connected together in series.

As noted above, a porous heating element can be formed to have any two-dimensional (e.g., having a dimension at least 2 orders of magnitude less than orthogonal dimensions) or three-dimensional (3-D) shape, for example, planar, tubular, cylindrical, disk-shaped, as well as complex non-standard geometries. For example, FIG. 6A illustrates a thermochemical reaction system 600 employing a porous heating element 602 with a planar or flat configuration. Similar to other examples described herein, thermochemical reaction system 600 has heating element 602 disposed in an internal volume within reactor 604, for example, with a center thereof being substantially aligned with a central axis 610 of the reactor 604. For example, the heating element 602 can have a thickness (along x-direction) that is less than 1 cm (e.g., sub-millimeter, such as ~250 μm), a width (along y-direction) that spans or is less than a corresponding diameter/width of the reactor, and a length (along z-direction) that is selected in conjunction with inlet gas flow rate and outlet gas flow rate to provide a predetermined residence time for reactants within reactor 604. A controller 612 is operatively coupled to the heating element 602 via appropriate electrical connections in order to apply a desired power waveform to the heating element 602 to provide multiple heating cycles during the predetermined residence time.

An inlet flow 606 of reactant and/or carrier gases can be provided to one axial end of the reactor 604, and an outlet flow 608 of product, reactant, and/or carrier gases can be extracted from an opposite axial end of the reactor. In some embodiments, a flow rate (e.g., mass flow rate) of the inlet flow 606 is substantially identical to that of the outlet flow 608. Alternatively, in some embodiments, the inlet flow rate is different from the outlet flow rate. In the illustrated example, the inlet flow 606 and the outlet flow 608 are aligned with the central axis 610 of the reactor, and the porous heating element 602 is arranged with a major surface thereof (e.g., having the largest exposed surface area) being substantially parallel to the direction of gas flow through the reactor. Alternatively, in some embodiments, the inlet flow 606 and outlet flow 608 can be offset from each other and/or from the central axis. For example, in the x-y plane, an axis of the inlet flow 606 can be disposed on one side of the heating element 602, and an axis of the outlet flow 608 can be disposed on an opposite of heating element 602.

In some embodiments, multiple heating elements can be provided with a single reactor. The multiple heating elements can be operated in series or in parallel, for example, to provide a longer residence time for reactants, to provide temporal or spatial variations in temperature (e.g., multi-step reactions and/or chain reactions), or for any other reason. For example, FIG. 6B illustrates a thermochemical reaction system 620 employing an array 622 of porous heating elements 602a-602c oriented parallel to the directions of inlet flow 606 and outlet flow 608. Each of the heating elements 602a-602c of the array 622 can have substantially the same shape and operating characteristics. Alternatively, the heating elements 602a-602c can have different shapes, for example, to accommodate differences in reactor geometry in regions away from the central axis 610. The heating elements of the array 622 can be connected together in series or in parallel, so as to be energized together by controller 612. Alternatively, in some embodiments, the heating elements of the array 622 can be separately connected to controller 612 or be separately connected to respective controllers, such that each of the heating elements is capable of independent operation from others within the array 622.

In another example, FIG. 6B illustrates a thermochemical reaction system 640 employing a linear array 642 of porous heating elements 644a-644c oriented serially with respect to the directions of inlet flow 606 and outlet flow 608. In FIG. 6B, each of the heating elements 644a-644c are connected together in parallel and to controller 612. FIG. 6C illustrates a thermochemical reaction system 660 substantially similar to that of FIG. 6B, but the linear array 662 of porous heating elements 664a-664c are connected together in series and to controller 612. In the illustrated examples of FIGS. 6B-6C, the linear arrays 642, 662 are aligned with the central axis 610 of the reactor 604. However, other arrangements for the array that are not aligned with the central axis 610 (e.g., at off-axis locations in the x-y plane) are also possible. In some embodiments, the heating elements of array 642, 662 can be operated in parallel, for example, to provide simultaneous heating cycles with the same heating waveform and peak temperature. Alternatively, in some embodiments, at least some of the heating elements of array 642 or array 662 can have different properties (e.g., size, material composition, etc.) resulting in different heating operation (e.g., peak temperature) for the same applied power waveform. Alternatively or additionally, in some embodiments, the heating elements of the array 622 can be separately connected to controller 612 or be separately connected to respective controllers, such that each of the heating elements is capable of independent operation from others within the array 622, for example, to provide a spatial variation of temperature within the reactor (e.g., along the z-direction).

Figures 7A, 7B, 8A, 8B:
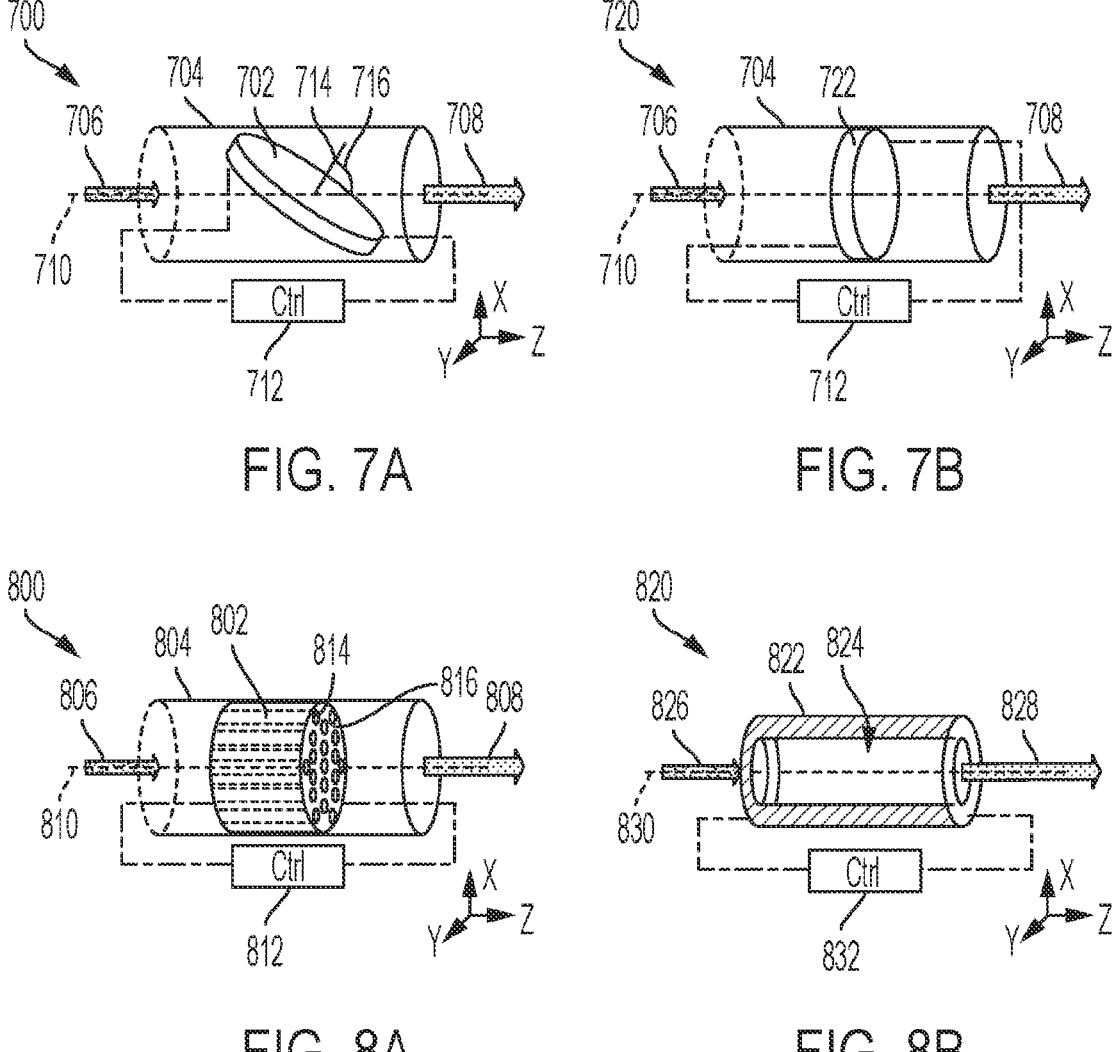
FIG. 7A illustrates an exemplary configuration for a heating element arranged non-parallel to reactant flow in a thermochemical reaction system, according to one or more embodiments of the disclosed subject matter.
FIG. 7B illustrates an exemplary variation of the configuration of FIG. 7A that employs a heating element arranged perpendicular to reactant flow.
FIG. 8A illustrates an exemplary configuration for a heating element having a three-dimensional structure in a thermochemical reaction system, according to one or more embodiments of the disclosed subject matter.
FIG. 8B illustrates another exemplary configuration for a heating element forming a flow conduit of a reactor in a thermochemical reaction system, according to one or more embodiments of the disclosed subject matter.

Although the flat parallel configurations of FIGS. 6A-6D provides a simple and convenient approach for arranging the heating elements within the reactor, other configurations may enhance interaction of the heating element with the flowing gas molecules to improve thermal performance. For example, in some embodiments, the heating element is angled with respect to the inlet flow direction, so as to force the reactants therein to flow through the pores of the heating element. For example, FIGS. 7A-7B illustrate thermochemical reaction systems employing porous heating elements arranged at a non-zero angle with respect to the inflow direction. Thermochemical reaction system 700 in FIG. 7A has heating element 702 disposed in an internal volume within reactor 704, and the thermochemical reaction system 720 in FIG. 7B has heating element 722 disposed in an internal volume of reactor 704. In FIG. 7A-7B, a controller 712 is operatively coupled to the respective heating element via appropriate electrical connections in order to apply a desired power waveform thereto to provide multiple heating cycles during the predetermined residence time. Although FIGS. 7A-7B illustrate a single heating element within the reactor, multiple heating elements can also be provided in a manner similar to that described with respect to FIGS. 6C-6D.

Similar to other examples described herein, an inlet flow 706 of reactant and/or carrier gases can be provided to one axial end of the reactor 704, and an outlet flow 708 of product, reactant, and/or carrier gases can be extracted from an opposite axial end of the reactor 704. However, in FIG. 7A, the porous heating element 702 is arranged with a major surface thereof (e.g., having the largest exposed surface area) at a non-zero angle (e.g., angle 716 between surface normal 714 and central axis 710) with respect to the direction of gas flow through the reactor. In FIG. 7B, the porous heating element 722 is further rotated from the parallel arrangements of FIGS. 6A-6D so as to have its major surface arranged substantially perpendicular to the central axis 710 and/or the inlet flow 706 direction. Thus, rather than passing around top and bottom parallel surfaces of the heating element as in FIGS. 6A-6D, the configurations of FIGS. 7A-7B forces the inlet flow 706 to pass through the thickness of the respective porous heating element 702, 722, which may enable better heat exchange between reactants and the heating element and/or more precise temperature control.

Although FIGS. 6A-7B illustrate simple planar shapes, heating elements can have any geometric shape (e.g., oval, triangle, etc.) or any arbitrary shape. Indeed, when the heating element is formed of carbon, the resulting structure can have sufficient flexibility to be manipulated into custom shapes for enhanced interaction with flowing reactants. Moreover, in some embodiments, the heating element can be formed into a 3-D structure (e.g., size in each dimension on a same order of magnitude) rather than just a thin planar structure. For example, FIG. 8A illustrates a thermochemical reaction system 800 employing a 3-D structure for porous heating element 802. The thermochemical reaction system 800 has heating element 802 disposed in an internal volume within reactor 804. A controller 812 is operatively coupled to the heating element 802 via appropriate electrical connections in order to apply a desired power waveform thereto to provide multiple heating cycles during the predetermined residence time. Although FIG. 8A illustrates a single heating element within the reactor, multiple heating elements can also be provided in a manner similar to that described with respect to FIGS. 6C-6D.

Similar to other examples described herein, an inlet flow 806 of reactant and/or carrier gases can be provided to one axial end of the reactor 804, and an outlet flow 808 of product, reactant, and/or carrier gases can be extracted from an opposite axial end of the reactor 804. Similar to the arrangement in FIG. 7B, the porous heating element 802 is disposed with an inlet face thereof arranged substantially perpendicular to central axis 810 of the reactor 804 and/or the inlet flow 806 direction. However, in contrast to the heating element in FIG. 7B, the porous heating element 802 has a substantial length (e.g., greater than 1 cm, for example, on the order of tens of centimeters) along the flow direction (e.g., z-direction). The length of heating element 802 can be selected in conjunction with inflow flow 806 rate, outflow flow 808 rate, or both, in order to provide a desired residence time in thermal contact with the heating element. In some embodiments, optional flow channels 814 can be provided within the porous body 816 of the heating element 802. In some embodiments, the flow channels 814 can have a cross-sectional size greater than the pore size of body 816 of the heating element 802, for example, to help reduce flow resistance through the reactor 804.

In some embodiments, the heating element can be formed into more complex shapes or structures than those illustrated in FIGS. 6A-8A, for example, to allow the heating element to define flow paths for gaseous reactants and/or products. For example, FIG. 8B illustrates a thermochemical reaction system 820 employing a 3-D structure for porous heating element 822. In the illustrated example, heating element 822 is formed as a substantially annular tube (cutaway to show interior for illustration purposes only) that defines a fluid conduit 824 within or of the reactor 820. Similar to other examples described herein, an inlet flow 826 of reactant and/or carrier gases can be provided to one axial end of the heating element 822 acting as fluid conduit, and an outlet flow 828 of product, reactant, and/or carrier gases can be extracted from an opposite axial end of the heating element 822. A controller 832 is operatively coupled to the heating element 822 via appropriate electrical connections in order to apply a desired power waveform thereto, to provide multiple heating cycles to gas flow within conduit 824 during the predetermined residence time. Although FIG. 8B illustrates a single heating element 822, multiple heating elements can also be provided in parallel (e.g., with central axes 830 parallel to, but offset from each other in x-y plane) or in series (with central axes 830 substantially coaxial).

Membrane Reactor Examples

Figure 9A:
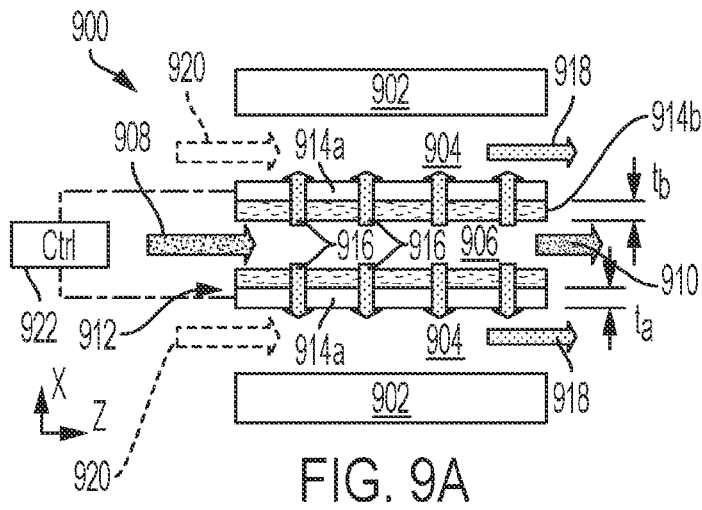
FIG. 9A illustrates an exemplary configuration for a heating element forming an asymmetric membrane reactor in a thermochemical reaction system, according to one or more embodiments of the disclosed subject matter.
Figure 9B:
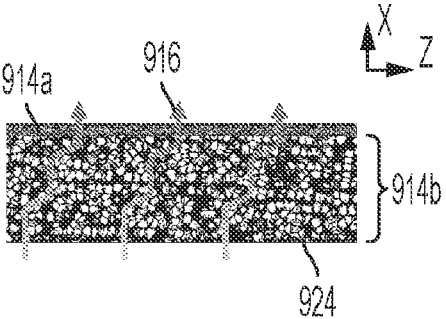
FIG. 9B is a cross-sectional view of a fabricated asymmetric membrane for use in the system configuration of FIG. 9A.

In some embodiments, the heating element can be formed into more complex shapes or structures than those illustrated in FIGS. 6A-8B, for example, to allow the heating element to act as a separation membrane as well as provide heating. For example, FIGS. 9A-9B illustrates a membrane reactor 900 configuration for a thermochemical reaction system employing a multi-function heating element 912. The multi-function heating element 912 comprises an asymmetric membrane formed by an outer annular layer 914a and an inner annular layer 914b. The inner annular layer 914b defines a first flow volume 906, to which an inlet flow 908 of reactants is provided and from which an outlet flow 910 of un-reacted reactants exists. The membrane reactor 900 also has an outer tube 902 (e.g., quartz or ceramic tube) that surrounds the outer annular layer 914a of the heating element 912. A second flow volume 904 is defined in the annular space between the outer tube 902 and the outer annular layer 914a. A controller 922 is operatively coupled to the heating element 912 via appropriate electrical connections in order to apply a desired power waveform thereto, in particular, to provide multiple heating cycles to gas flow within conduit first flow volume 906 during a predetermined residence time.

In operation, reactants within first flow volume 906 undergo thermochemical reactions upon application of the heating cycles by the heating element 912. The asymmetric membrane of the heating element 912 is constructed to allow products 916 generated in the first flow volume 906 to pass therethrough to the second flow volume 904 (e.g., via diffusion), where the products are collected via outlet flow 918. In some embodiments, the second flow volume 904 is provided with an optional carrier or sweep gas flow 920 to help collect the products 916 into outlet flow 918. For example, the sweep gas flow 920 can comprise hydrogen gas, nitrogen gas, a noble gas, or any combination thereof. In some embodiments, in addition to carrying products from the membrane surface, the sweep gas can be used for heat recovery or preheating of gases.

For example, when the membrane reactor is employed for ammonia synthesis, the membrane of the heating element 912 can remove the formed ammonia in situ to drive equilibrium toward ammonia formation and avoid ammonia decomposition. The quenching following peak temperature application in the heating cycle can prevent, or at least reduce, ammonia decomposition. Prior to the next heating cycle, ammonia can be separated by membrane of the heating element 912 due to the size exclusion effect and removed from the membrane reactor 900 via outlet flow 918.

The bilayer construction of the asymmetric membrane can allow for separate optimizations of the heating element functionalities. For example, the radially-outer layer 914a of the heating element 912 can be optimized for separation, for example, by having a pore size selected based on the kinetic diameters of reactant and product molecules. To that end, the radially-outer layer 914a may also have a relatively narrow thickness to allow efficient diffusion of products therethrough. In contrast, the radially-inner layer 914b of the heating element 912 can be optimized for diffusion, for example, by having a larger pore size (e.g., a pore size at least 1000 times greater than that of layer 914a). To that end, the radially-inner layer 914b can be made relatively thicker, for example, to providing Joule heating effect, provide structural support and/or offer increased surface area for loading of catalysts (e.g., nanoparticles 924) therein or thereon. In some embodiments, the radially-outer layer 914a and the radially-inner layer 914b can be formed of the same material (e.g., elemental carbon or a carbon-containing material), but with different thicknesses and pore sizes. For example, in an ammonia synthesis reaction, the radially-outer layer 914a can have a pore size of <2 nm (e.g., ~0.3 nm) and a thickness, ta, less than 1 µm, and the radially-inner layer 914b can have a pore size of >100 nm (e.g., ~1 µm) and a thickness, to, of 1-2 mm. The formed ammonia will be separated by the nanoporous layer 914a due to size exclusion (e.g., based on kinetic diameters: $d_{NH3}$=2.6 Å, $d_{H2}$=2.9 Å, $d_{N2}$=3.6 Å).

Figure 9C:
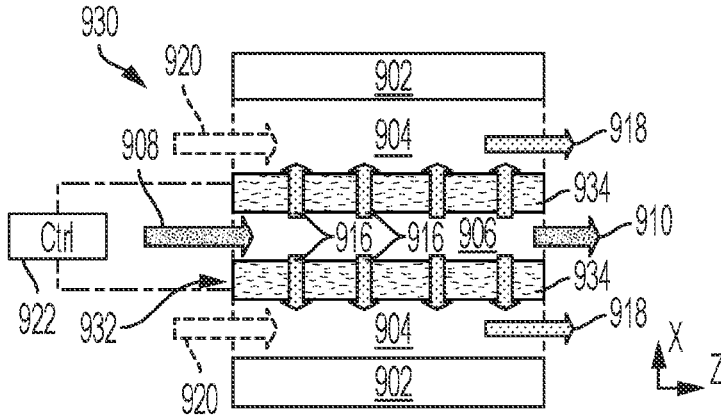
FIG. 9C illustrates an exemplary configuration for a heating element forming a symmetric membrane reactor in a thermochemical reaction system, according to one or more embodiments of the disclosed subject matter.

Alternatively, in some embodiments, the heating element comprises a symmetric membrane construction. For example, FIG. 9C illustrates a thermochemical reaction system 930 employing a heating element 932 with symmetric membrane (e.g., a single layer 934). The single membrane layer 934 can be constructed similar to outer layer 914a in FIGS. 9A-9B but thicker (e.g., intermediate between thickness $t_a$ and thickness $t_b$ described with respect to FIGS. 9A-9B), in order to provide a combination of functions, for example, product separation, Joule heating effect, structural support and/or surface area for loading of catalysts. Operation of thermochemical reaction system 930 would otherwise be substantially identical to that of system 900. Although FIGS. 9A-9C illustrate a particular membrane reactor configuration, embodiments of the disclosed subject matter are not limited thereto. Indeed, other membrane reactor setups or configurations also possible, for example, similar to those disclosed in U.S. Pat. No. 10,525,407, incorporated herein by reference, but with the presently disclosed heating elements replacing the membrane and/or support tubes described in the '407 patent.

Figure 10A:
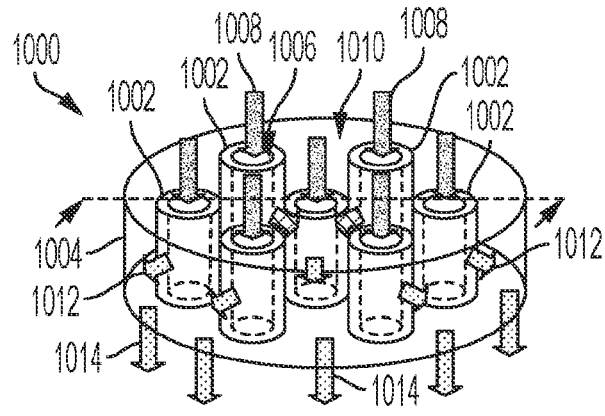
FIG. 10A is a simplified perspective view of an exemplary setup employing a bundle of membrane reactors for parallel processing in a thermochemical reaction system, according to one or more embodiments of the disclosed subject matter.
Figure 10B:
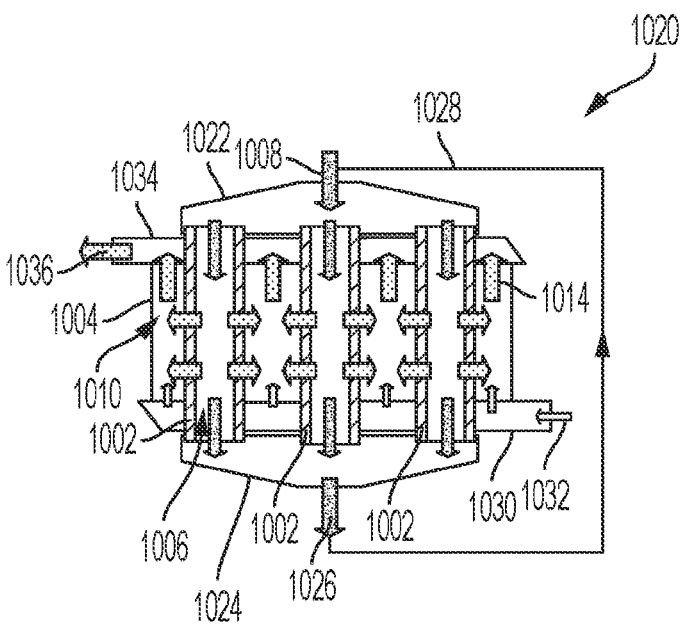
FIG. 10B is a simplified cross-sectional view illustrating exemplary operational aspects of the reactor bundle setup of FIG. 10A.

In some embodiments, membrane reactors similar to that illustrated in FIGS. 9A-9C can be bundled together in a single thermochemical reaction system, for example, to increase processing capacity or throughput. For example, FIGS. 10A-10B illustrate a thermochemical reaction system 1000 employing multiple membrane reactors, in particular, individual membrane heating elements 1002 shaped as tubes and arrayed in parallel within a common outer conduit 1004. Inlet gas flow 1008 is provided to the reaction volume defined by the internal conduit 1006 of each membrane heating element 1002, for example, using an inlet manifold 1022 for parallel distribution of reactants. A controller (not shown) is operatively coupled to the membrane heating elements 1002 via appropriate electrical connections in order to apply a desired power waveform thereto, to provide multiple heating cycles to gas flow within conduits 1006 during the predetermined residence time.

Products 1012 produced by the thermochemical reactions of the reactants in conduits 1006 are separated by the membrane heating elements 1002 to a shared flow volume 1010 defined in the interstitial space between the outer conduit 1004 and the bundle of heating elements 1002. The products in flow volume 1010 are collected as outlet flow 1014, for example, by application of a sweep gas 1032 applied to the flow volume 1010 via header 1030. The outlet flows 1014 can be collected by header 1034 as outlet flow 1036 for removal of the products from the system for use or storage. Meanwhile, unreacted reactants in each internal conduit 1006 can be collected together at outlets thereof by another manifold 1024. The resulting outlet stream 1026 can be recirculate back as inlet gas flow 1008 via recirculation fluid circuit 1028.

Thermochemical Reaction System Examples

Figure 11:
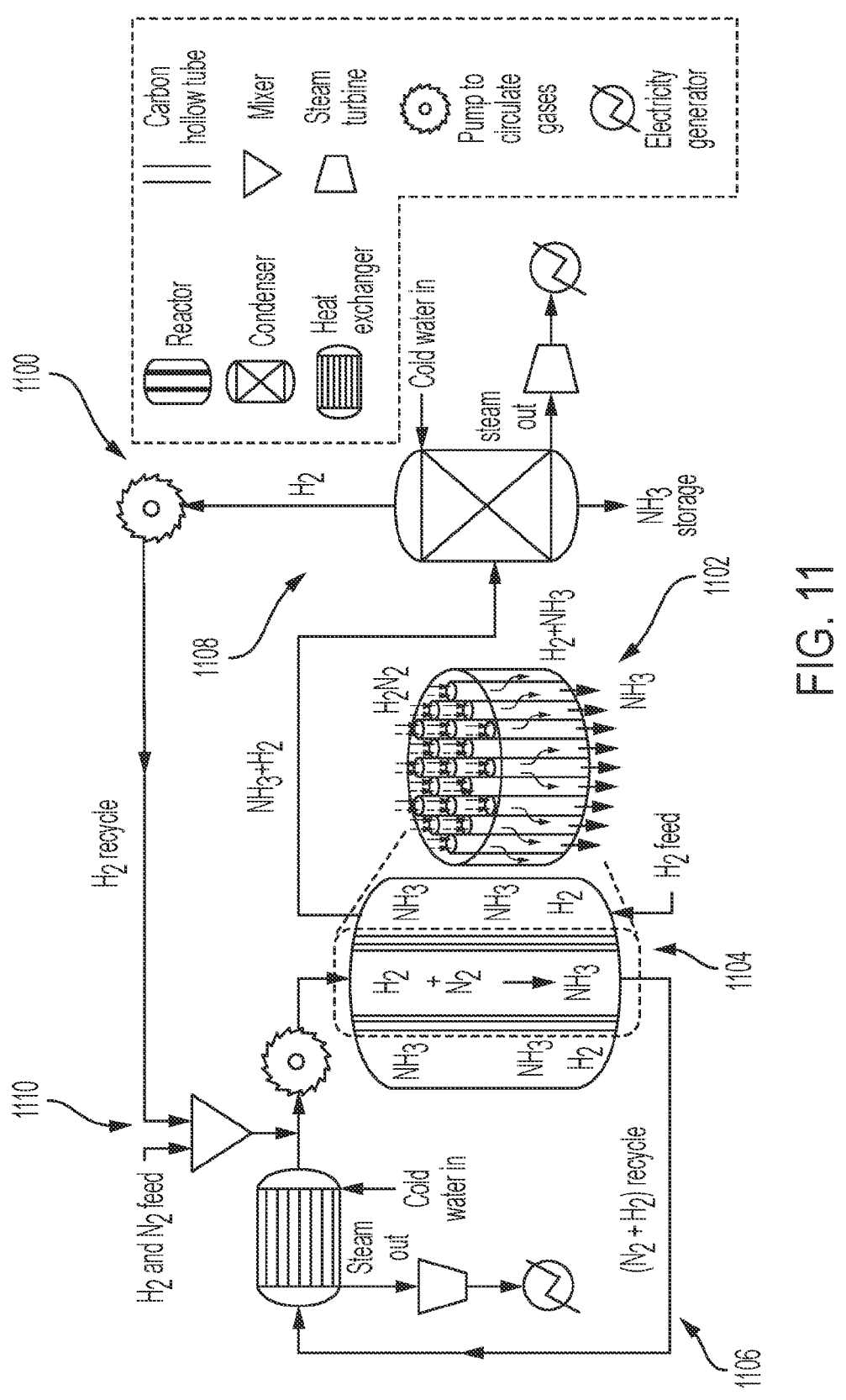
FIG. 11 is a simplified schematic diagram illustrating an exemplary thermochemical reaction system for producing ammonia from hydrogen and nitrogen gases, according to one or more embodiments of the disclosed subject matter.

FIG. 11 illustrates an example of a thermochemical reaction system 1100 employing membrane reactor bundles 1102 in the production of ammonia from nitrogen gas and hydrogen gas feeds 1110. In the designed system, reactant gases can be preheated by the heat of reaction. After the thermochemical reaction in each membrane reactor (as shown at 1104), the outlet flow containing ammonia and sweep gas (e.g., $H_2$) can be directed to a first circuit loop 1108. In addition to directing the ammonia product to an outlet of the membrane reactor, the sweep gas can also provide cooling to the exothermic ammonia synthesis reaction and thereby avoid or at least reduce the occurrence of ammonia decomposition. For example, first circuit loop 1108 can provide product separation (e.g., separation of the ammonia from the sweep gas), product storage (e.g., by condensing the ammonia), and/or energy recovery (e.g., by using heat in the outlet flow to produce steam under pressure for electricity generation). The separated sweep gas can be returned to the membrane reactor bundle, for example, for reuse as sweep gas or repurposed as a reactant with feed stocks 1110. Meanwhile, the outlet flow of unreacted reactants from each membrane reactor (as shown at 1104) can be directed to a second circuit loop 1106. For example, second circuit loop 1110 can provide reactant recycling (e.g., by combining with new feed stock at 1110) and/or energy recovery (e.g., by using heat in the outlet flow to produce steam under pressure for electricity generation). Other configurations for thermochemical reaction systems employing membrane reactor bundles 1102 are also possible according to one or more contemplated embodiments.

Fabricated Examples and Experimental Results

Figure 12:
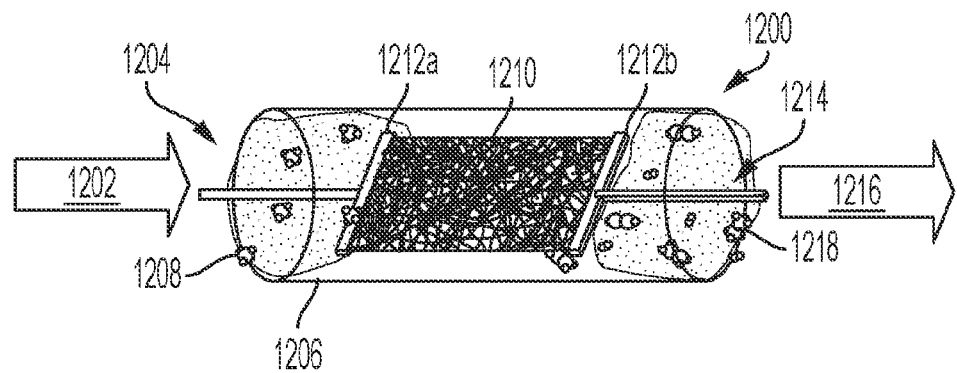
FIG. 12 is a simplified schematic diagram of an experimental setup that was used for thermochemical processing of methane.

FIG. 12 illustrates a reactor setup 1200 employed in experiments for thermochemical processing of gaseous reactants. In the setup 1200, a planar heating element 1210 (e.g., rectangular parallelepiped with narrow thickness) is disposed within an internal flow volume of reactor 1206 (e.g., high-temperature tube). In fabricated examples, a porous carbon material with high gas permeability was used as the heating element 1210 in the reactor setup 1200. Electrical connections 1212a, 1212b were made at opposite ends of the planar heating element 1210 in order to pass a current therethrough to effect Joule heating. Due to its low heat capacity, the planar heating element 1210 was able to achieve heating and cooling rates of ~$10^4$ K/s. During heating cycles of the heating element 1210, the gas-phase reactants (e.g., molecules 1208 in inlet flow 1202) flow through the reactor 1206 and come into direct contact with the porous carbon material of heating element 1210, passing through and directly interacting with its microstructure, thereby closely following the programmed heating pattern of the heating element 1210 (e.g., in a noncontinuous or discontinuous manner). Over 90% of the electrical energy applied to the heating element via connections 1212a, 1212b can be converted to heat the gas molecules 1208, resulting in a more energy efficient process as compared to conventional approaches. The high temperatures (e.g., greater than 1000 K) resulting from the heating element during each heating cycle initiates a thermochemical reaction or reactions that generate a product gas (e.g., hydrocarbon molecules 1218). The resulting product gas and any un-reacted reactant gas can be removed from the reactor via flow 1216 from outlet port 1214.

In the fabricated examples, carbon paper (Freudenberg H23 gas diffusion layer, manufactured by Freudenberg Performance Materials SE, Germany, having a thickness of 210 µm, a through-plane electrical resistivity of 4.5 mΩ-cm² at 1 MPa and an in-plane electrical resistance of 0.8Ω, and a through-plane air permeability of 400 L/m²-s (DIN EN ISO 9237)) or carbon felt (AvCarb G475A soft graphite battery felt, manufactured by AvCarb Material Solutions, Lowell, Massachusetts, having a thickness of 4.7 mm, and an electrical resistivity of 200 mΩ-cm² at 6.3 psi or activated carbon felt ACF 1000, sold by Fuel Cell Earth) was used for the heating element. In some examples, the carbon felt was loaded with Ru (2 wt %) or Fe catalyst (2 wt %), for example, using the method described in U.S. Patent Application Publication No. 2019/0161840, published May 30, 2019, which is incorporated herein by reference. For electrical connection to the heating element, multipurpose 110 copper wire (99.9%, also known as electrolytic-tough-pitch (ETP) copper, 0.04" diameter) and multipurpose 110 copper sheets (99.9% pure copper, also known as ETP copper, 0.002" thickness) were used. Alumina ceramic protection tubes (99.8%, 0.125" outer diameter and 0.062" inner diameter, maximum temperature 2223 K) were used to cover the copper wires and prevent the copper wires from heating the sealing materials.

In the fabricated examples involving methane pyrolysis, carbon paper having planar dimensions of 40 mm×8 mm was used, of which a central section of 20 mm×8 mm was exposed within the reactor volume as a heating element and 10 mm×8 mm sections at each end were otherwise wrapped in copper foil to provide electrical connection. In the fabricated examples involving ammonia synthesis, carbon felt having planar dimensions of 35 mm×8 mm was used, of which a central section of 15 mm×8 mm was exposed within the reactor volume as a heating element and 10 mm×8 mm sections at each end were otherwise wrapped in copper foil to provide electrical connection. In the fabricated examples, the copper-foil-wrapped regions were connected with copper wire, without the need for conductive glue or paste. The copper wires extended out of the alumina ceramic protection tube. In the fabricated example, each end of the alumina ceramic protection tube was sealed with epoxy. The carbon heating element, copper material, and alumina ceramic protection tubes were further placed in a quartz tube reactor (½" diameter), which was connected with union fittings (Swagelok Ultra-Torr Union Tee, sold by Swagelok Company, Solon, Ohio) on each end. One port of the union fitting was used for the electrical connection, while the other was used for the gas inlet or outlet. The copper wire from the port was connected to an appropriate signal generation setup.

In particular, to provide the appropriate electrical control signal to the heater, a solid-state relay device (sold by Omega Engineering, Inc., Norwalk, Connecticut) with DC input and DC output (maximum current 25 A) was used. The input signal to the solid-state relay was provided by a source meter (Keithley Model 2425 SourceMeter, sold by Tektronix, Inc., Beaverton, Oregon), and the output signal was provided by a variable DC power source (Volteq Variable Switching DC Power Supply HY7520 EX, 75 V, 20 A, sold by Acifica, Inc., San Jose, California). In programmed heating and quenching (PHQ) operation of the reactor setup 1200, depending on the length of the high-temperature pulse desired, for each heating cycle the initial time duration was set as "power on" (e.g., 20 ms on), while the remaining time up to 1100 ms was set as "power off" (e.g., 1080 ms off). Due to changes in defect level and crystallinity of the carbon heater during heating operations that can decrease its resistance, the electrical signal was adjusted during operations to maintain peak temperature.

Figures 14A, 14B, 14C, 14D, 15A, 15B:
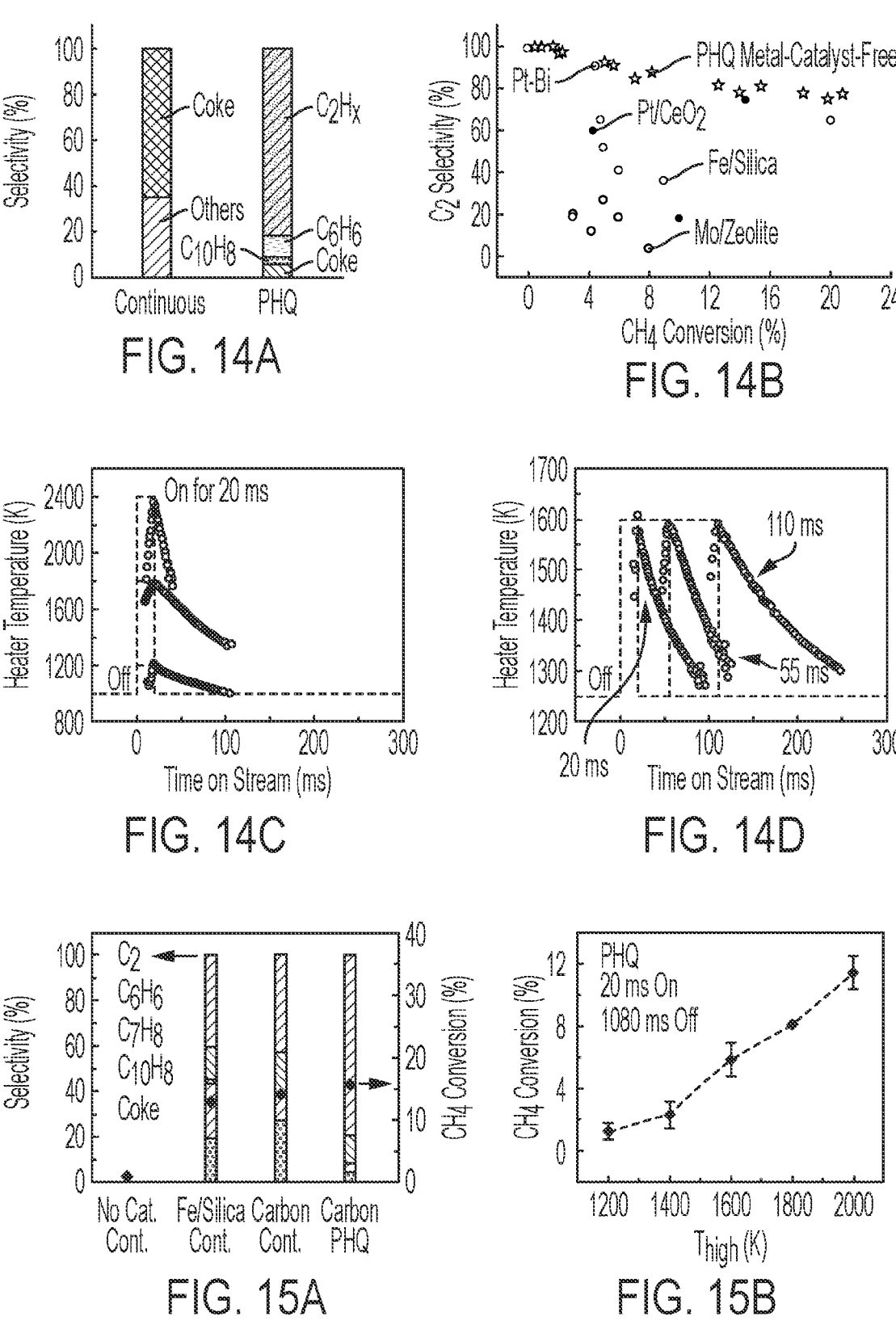
FIG. 14A is a graph comparing products resulting from pyrolysis of methane using the continuous heating technique with products resulting from pyrolysis of methane using the PHQ heating technique.
FIG. 14B is a graph comparing $C_2$ selectivity resulting from pyrolysis of methane using the PHQ heating technique to $C_2$ selectivity using continuous heating techniques employing catalysts.
FIG. 14C is a graph of temperature profile of the heating element for input electrical pulses of different peak powers but with the same pulse durations.
FIG. 14D is a graph of temperature profiles of the heating element for input electrical pulses of different durations but with same the peak temperature.
FIG. 15A is a graph comparing $C_2$ selectivity resulting from pyrolysis of methane using the PHQ heating technique to $C_2$ selectivity using continuous heating techniques under various conditions.
FIG. 15B is a graph of methane conversion versus peak temperature using the PHQ heating technique with the same pulse duration.

To generate heat, an electric current is passed through the porous carbon heating element, which due to its low heat capacity (e.g., $<6.6 \times 10^{-6}$ J/K) is able to reach heating and cooling rates of $\sim 10^4$ K/s, as shown in FIG. 14C. Since the gas-phase reactants flow into direct contact with the heating element, passing through and directly interacting with its microstructure, the reactants closely following the programmed heating pattern of the heating element. And since the heating element is capable of efficiently generating high temperatures (e.g., greater than 1200 K and up to 2400 K) that can exponentially increase the methane activation rate for high conversion, the reactor setup of FIG. 12 requires no additional catalyst in order to perform methane pyrolysis.

In fabricated examples, the heating cycles for PHQ operation of the reactor setup employed a pulse profile, where electrical power was applied to the heating element from an "off" state (e.g., no current applied) to an "on" state (e.g., full current applied) and held for 20 ms, followed by removing the electrical power for the remainder of the heating cycle (e.g., to turn the heating element back off for 1080 ms to complete a cycle period of 1100 ms). Each heating cycle was repeated multiple times while the reactants remained in thermal contact with the heating element (e.g., where residence time of the gaseous reactants in contact with the heating element is based on flow rate and heater length). By adjusting the input power for a specific pulse duration, the peak temperature ($T_{high}$) of the carbon heater can also be accurately controlled, as shown in FIG. 14C. And by adjusting the pulse duration of the input power, the resulting temperature profile can be tuned in a similar manner, as shown in FIG. 14D. Increased pulse duration can require decreased power input to reach the same peak temperature.

Figure 13A:
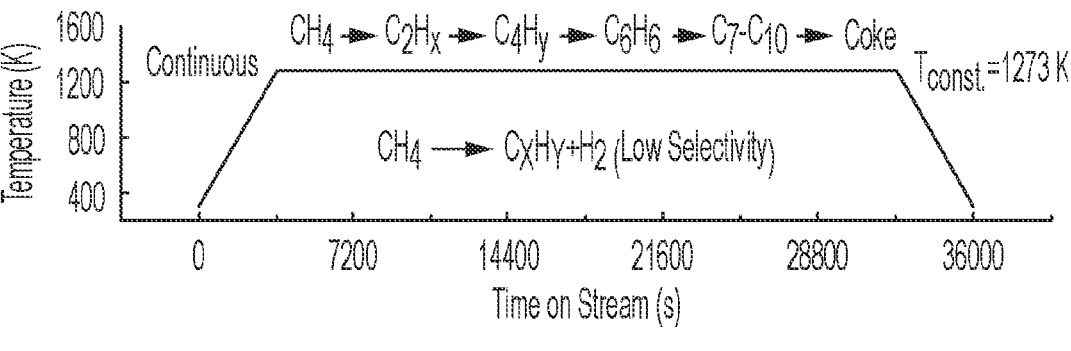
FIG. 13A is a graph illustrating conventional thermochemical processing of methane using continuous heating technique.
Figure 13B:
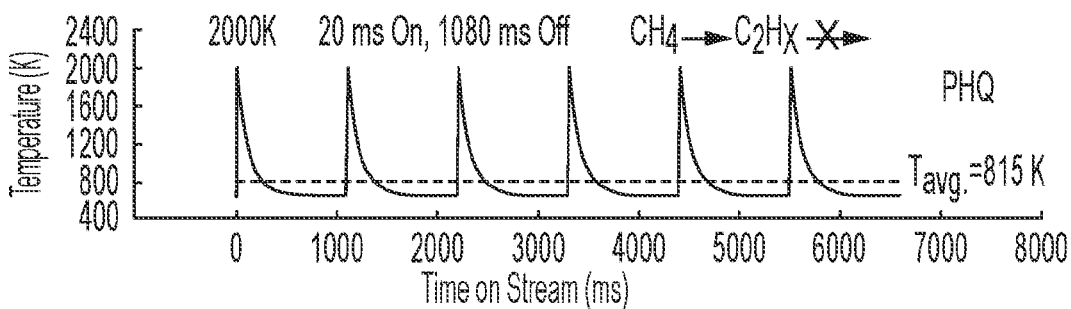
FIG. 13B is a graph illustrating thermochemical processing of methane using discontinuous heating technique (referred to as, programmable heating and quenching (PHQ)), according to one or more embodiments of the disclosed subject matter.

Fabricated examples of the reactor setup employing PHQ operation (e.g., the temperature profile illustrated in FIG. 13B) to drive thermochemical reactions were compared against continuous heating (e.g., the temperature profile illustrated in FIG. 13A) to drive the same reactions. For methane pyrolysis examples, continuous heating was conducted using a tube furnace in a catalyst-free setup under near-equilibrium conditions. In general, the continuous heating of FIG. 13A creates a variety of products due to the lack of tunability over the temperature profile, and thus the resulting reaction pathways. In contrast, the PHQ operation of FIG. 13B, which is enabled by the disclosed reactor setups, can selectively produces value-added $C_2$ products. The high temperature of the PHQ operation ensures high conversion even without any catalyst present, while the transient heating time enables high selectivity. Without being bound to any particular theory of operation, it is hypothesized that the high temperature of the PHQ heating cycle contributes to the fast activation of the C—H bond, while the transient reaction time can effectively prevent secondary and subsequent reactions toward undesired heavy aromatics and coke. As shown in FIG. 14A, the PHQ operation of FIG. 13B demonstrates much higher selectivity (e.g., >75% versus <35% without using a catalyst) to value-added $C_2$ hydrocarbons at comparable methane conversions (e.g., ~13%) as compared to the conventional continuous heating operation of FIG. 13A. It is further noted that the periodic switching between high and low temperatures (e.g., heating on for 20 ms and off for 1080 ms) made possible by PHQ technique translates to a much lower average temperature (815 K in FIG. 13B) than continuous heating (1273 K in FIG. 13A), thereby reducing the energy cost for comparable methane conversions.

With respect to $C_2$ product selectivity, the metal-catalyst-free PHQ technique with the fabricated reactor examples also outperformed continuous heating that had optimized catalysts, for example, the catalyst-based approaches for methane pyrolysis and direct non-oxidative methane conversion (DNMC) reactions shown in FIG. 14B. FIG. 15A further shows the product selectivity and methane conversion for four different reaction techniques, in particular (1) non-catalytic methane pyrolysis using continuous furnace heating at 1273 K; (2) catalytic methane pyrolysis with a state-of-the-art Fe/silica catalyst using continuous furnace heating at 1273 K; (3) methane pyrolysis with the carbon paper heating element (as shown in FIG. 12, but without any PHQ operation) using continuous furnace heating at 1273 K; and (4) methane pyrolysis using the reactor setup of FIG. 12 with PHQ operation. In the PHQ operation, the peak temperature, $T_{high}$ was 2200 K, and the pulse duration was 55 ms over a heating cycle period of 1100 ms (e.g., 55 ms on, 1045 ms off).

Using the same flow rate (e.g., 24 standard cubic centimeters per minute (sccm), 90 mol % methane and 10 mol % argon) and pressure (1 atm) for each reaction technique, the product distribution of the PHQ method was found to offer a significant improvement compared to the other techniques, with a much higher selectivity (~80%) for $C_2$ products, as illustrated in FIG. 15A. In comparison, only ~40% $C_2$ products were measured using continuous heating by a furnace at 1273 K with the Fe/silica catalyst. For the non-catalytic system, continuous furnace heating at 1273 K produced nearly zero product. Meanwhile, continuous heating in the presence of the carbon paper (e.g., using a furnace, without PHQ) showed some methane conversion (~15%), but with a large amount of undesired coke (~30%) and lower $C_2$ product selectivity (~40%).

These results suggest that low $C_2$ selectivity is intrinsic to the continuous heating method due to significant secondary and subsequent reactions resulting in the formation of low-value compounds, such as naphthalene and coke. In contrast, in the fabricated examples employing PHQ operation (e.g., 55 ms on, 1045 ms off during eating heating cycle), the average temperature ($T_{avg}$) is <900 K. Yet, PHQ operation is still able to achieve a comparable methane conversion (~15%) and much higher value-added $C_2$ product selectivity than those achieved by the Fe/silica catalyst using continuous heating. Without being bound to any particular theory, the high temperature of the PHQ technique promotes fast methane activation according to the Arrhenius law to achieve enhanced conversion, while the transient heating time and fast quenching gives rise to high selectivity to value-added $C_2$ intermediate products in the reaction network of methane pyrolysis.

Figures 15C, 15D, 16A, 16B, 16C, 16D:
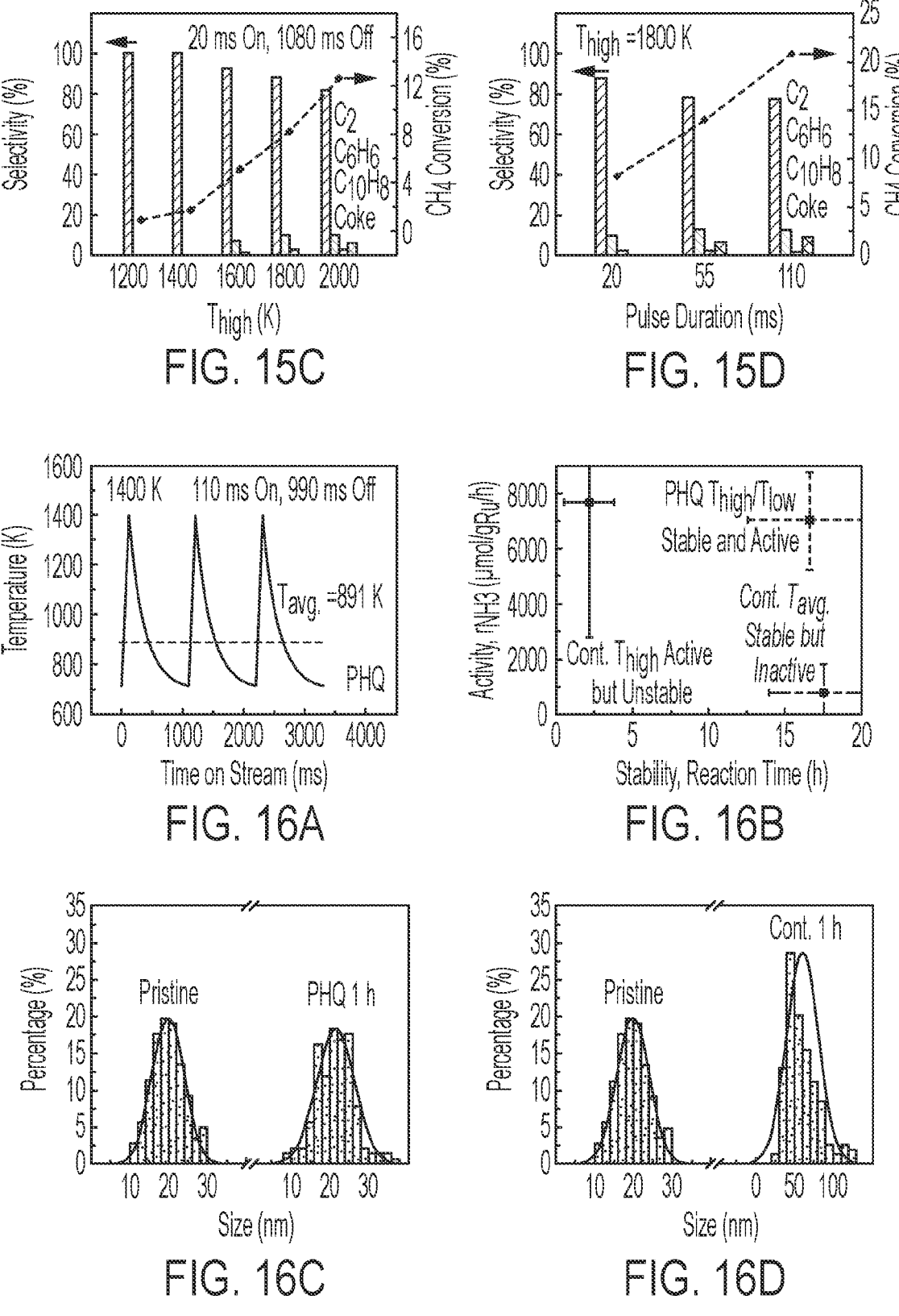
FIG. 15C is a graph of product selectivity from pyrolysis of methane versus peak temperature using the PHQ heating technique with the same pulse duration.
FIG. 15D is a graph of product selectivity from pyrolysis of methane versus pulse duration using the PHQ heating technique with the same peak temperature.
FIG. 16A is a graph illustrating thermochemical processing of ammonia using the PHQ technique, according to one or more embodiments of the disclosed subject matter.
FIG. 16B is a graph comparing activity and stability of ammonia products synthesized using the PHQ heating technique to that of ammonia products synthesized using continuous heating.
FIG. 16C is a graph comparing size and distribution of an Ru catalyst loaded on a carbon heating element before and after being subject to the PHQ heating technique for 1 hour.
FIG. 16D is a graph comparing size and distribution of an Ru catalyst loaded on a heating element before and after being subject to the continuous heating technique for 1 hour.

The effect of peak temperature, $T_{high}$, and pulse duration (e.g., heating time) on the methane pyrolysis reaction was further investigated. In particular, a lower flow rate (e.g., 4 sccm, 75 mol % methane and 25 mol % argon) was employed to increase the methane conversion. With a fixed pulse duration of 20 ms on and 1080 ms off, methane conversion monotonically increased with peak temperature, $T_{high}$, as shown in FIG. 15B. Such increased peak temperature at fixed pulse duration, however, leads to slightly lower selectivity to $C_2$ products but higher selectivity to benzene ($C_6H_6$) due to the increased reaction rate at higher temperatures, as shown in FIG. 15C. As shown in FIG. 15D, increasing the pulse duration at a constant peak temperature (e.g., $T_{high}$=1800 K) can achieve similar results by increasing reaction time (e.g., longer reaction progress), thereby offering another way to toggle between $C_2$ and $C_6H_6$ products. In general, the observed selectivities of the total $C_2$ products (e.g., >75%) by the metal-catalyst-free PHQ process shown in FIG. 15A-15D are better than those obtained by continuous heating with comparable methane conversions, even those that employ optimized catalysts.

For ammonia synthesis examples, continuous heating was conducted using the Ru-loaded or bare carbon felt as the heating element in a continuous operation mode. In general, continuous heating at a high temperature undermines catalyst stability in ammonia synthesis by accelerating its ripening process. In contract, the PHQ operation of FIG. 16A provides transient high-temperature heating and therefore a high ammonia production rate, while also ensuring good catalyst stability by rapidly quenching the reaction temperature. Ru supported on a carbon felt heater was selected as a model catalyst, as it exhibits activity for $N_2$ activation. While industrial ammonia synthesis is normally conducted at high pressures, fabricated examples operated under ambient pressure conditions (e.g., atmospheric pressure) to compare ammonia synthesis rates by PHQ operation and continuous heating, both using carbon felt as the heating element.

Employing the heating cycles illustrated in FIG. 16A (e.g., 110 ms on, 990 ms off; peak temperature, $T_{high}$, of 1400 K), the PHQ operation showed a stable performance that lasted for ~20 hours with an ammonia synthesis rate of ~7000 $\mu mol/g_{Ru}/h$, after which the activity started to decay (FIG. 16B), as measured by the Berthelot method. For comparison, the ammonia synthesis rates were also measure by continuous heating at $T_{high}$ (1400 K), $T_{low}$ (~700 K), and $T_{avg.}$ (~900 K). As shown in FIG. 16B, continuous heating at $T_{high}$ exhibited good activity that was comparable with PHQ operation, but only lasted for ~2 hours, and continuous heating at $T_{avg.}$ showed much worse activity although with comparable reaction time during which the ammonia synthesis rate was relatively stable. Finally, continuous heating at $T_{low}$ showed an almost zero ammonia synthesis rate due to the poor $N_2$ activation under low temperature.

Note that the presence of an active catalyst (e.g., Ru) for ammonia synthesis may be necessary, as without it the synthesis rate drops to close to zero whether the heating operation is continuous or PHQ. This also suggests that the heating element (e.g., carbon felt) and the electric circuit components (e.g., Cu wire) are themselves catalytically inactive in these processes. Scanning electron microscopy (SEM) was used to compare the size evolution of the Ru catalyst during PHQ and continuous heating at $T_{high}$. As shown in FIG. 16C, the Ru nanoparticles retained their original size and distribution after PHQ for 1 hour. In contrast, the Ru nanoparticles severely ripened after continuous heating at $T_{high}$ for the same duration, as shown in FIG. 16D.

Due to the improved catalyst stability offered by the PHQ operation (e.g., 110 ms on, 990 ms off; $T_{high}$ of 1200 K), a fabricated example of the reactor system was able to maintain stable ammonia production for ~100 hours with an average synthesis rate ($r_{NH3}$) of ~4000 $\mu mol/g_{Ru}/h$ using a non-optimized Ru catalyst. In another fabricated example of the reactor system using a non-optimized Fe catalyst, stable ammonia production for >100 hours was obtained with an average synthesis rate ($r_{NH3}$) of ~6000 µmol/$g_{Fe}$/h. Without being bound to any particular theory, this improvement over conventional ammonia synthesis techniques may be attributed to the higher temperature that is enabled by the PHQ method without sacrificing the catalyst stability because of the rapid temperature quenching. Moreover, other catalysts optimized for the ammonia synthesis in combination with the disclosed PHQ operation can yield even greater improvements in synthesis rates.

Additional Examples of the Disclosed Technology

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A method, comprising:
(a) for a first time period, providing one or more reactants in thermal contact with a first heating element in a reactor;
(b) during a first part of a heating cycle, providing the one or more reactants with a first temperature by heating with the first heating element, such that one or more thermochemical reactions is initiated; and
(c) during a second part of the heating cycle, providing the one or more reactants with a second temperature less than the first temperature,
wherein a duration of the first time period is equal to or greater than a duration of the heating cycle,
the duration of the heating cycle is less than five seconds,
the first heating element operates by Joule heating and has a porous construction that allows gas to flow therethrough, and
the one or more thermochemical reactions comprises pyrolysis, thermolysis, synthesis, hydrogenation, dehydrogenation, hydrogenolysis, or any combination thereof.

Clause 2. The method of any clause or example herein, in particular Clause 1, further comprising, after (c) removing one or more gaseous products of the one or more thermochemical reactions from the reactor.

Clause 3. The method of any clause or example herein, in particular any one of Clauses 1-2, wherein (b) comprises applying a first electrical power level to the first heating element, and (c) comprises applying a second electrical power level or no electrical power to the first heating element, the second electrical power level being less than the first electrical power level.

Clause 4. The method of any clause or example herein, in particular any one of Clauses 1-3, wherein (b) and (c) comprise applying an electrical power waveform to the first heating element, the waveform comprising at least a first electrical power level corresponding to the first temperature and a second electrical power level corresponding to the second temperature.

Clause 5. The method of any clause or example herein, in particular Clause 4, wherein the waveform comprises a pulse, a rectangular wave profile, a stepped profile, a triangular wave profile, a sine wave profile, or any combination thereof.

Clause 6. The method of any clause or example herein, in particular any one of Clauses 1-5, wherein the second part of the heating cycle immediately follows the first part of the heating cycle, a duration of the first part is 10-400 milliseconds (e.g., 15-150 ms), and/or a duration of the second part is 1-1.5 seconds.

Clause 7. The method of any clause or example herein, in particular any one of Clauses 1-6, wherein the second temperature is at least 600 K less than the first temperature.

Clause 8. The method of any clause or example herein, in particular any one of Clauses 1-7, wherein the first temperature is greater than or equal to 1200 K.

Clause 9. The method of any clause or example herein, in particular any one of Clauses 1-8, wherein the second temperature is less than or equal to 800 K.

Clause 10. The method of any clause or example herein, in particular any one of Clauses 1-9, wherein the one or more thermochemical reactions occur with the reactor at atmospheric pressure or at a pressure less than or equal to 20 MPa.

Clause 11. The method of any clause or example herein, in particular any one of Clauses 1-10, wherein (a) comprises flowing a first reactant of the one or more reactants into contact with or through the first heating element, wherein the first time period is based on at least a flow rate of the first reactant and a size of the first heating element.

Clause 12. The method of any clause or example herein, in particular any one of Clauses 1-11, wherein (b) comprises supplying an electrical current to the first heating element, and (c) comprises reducing or removing the electrical current from the first heating element.

Clause 13. The method of any clause or example herein, in particular any one of Clauses 1-12, wherein the duration of the first time period is at least two times greater than the duration of the heating cycle, and the method comprises repeating (b) and (c) at least once during the first time period.

Clause 14. The method of any clause or example herein, in particular any one of Clauses 1-13, wherein (a) comprises recirculating reactants unreacted by a previous heating cycle back into thermal contact with the first heating element, and the method further comprises: (d) repeating (b)-(c).

Clause 15. The method of any clause or example herein, in particular Clause 14, wherein (a) and (d) are continuously performed for at least 100 hours.

Clause 16. The method of any clause or example herein, in particular any one of Clauses 1-15, wherein the reactor, the first heating element, or both include one or more catalysts.

Clause 17. The method of any clause or example herein, in particular Clause 16, wherein the one or more catalysts comprise single element nanoparticles, multi-element nanoparticles, or any combination thereof.

Clause 18. The method of any clause or example herein, in particular any one of Clauses 1-17, wherein the first heating element comprises a pure carbon or carbon-containing material.

Clause 19. The method of any clause or example herein, in particular Clause 18, wherein the first heating element comprises porous carbon or porous silicon carbide (SiC).

Clause 20. The method of any clause or example herein, in particular any one of Clauses 1-19, wherein the first heating element has a heat capacity less than $1 \times 10^{-5}$ J/K.

Clause 21. The method of any clause or example herein, in particular any one of Clauses 1-20, wherein a heating rate to the first temperature, a cooling rate to the second temperature, or both is at least 103 K/s.

Clause 22. The method of any clause or example herein, in particular Clause 21, wherein the heating rate, the cooling rate, or both is about 104 K/s.

Clause 23. The method of any clause or example herein, in particular any one of Clauses 1-22, wherein the first heating element is formed as a porous membrane that allows at least one gaseous product of the one or more thermochemical reactions to pass therethrough to a second flow path while retaining the one or more reactants in a first flow path.

Clause 24. The method of any clause or example herein, in particular any one of Clauses 1-22, wherein the first heating element is formed as a porous membrane that allows one or more reactants to pass therethrough to a second flow path while retaining the one or more reactants in a first flow path.

Clause 25. The method of any clause or example herein, in particular any one of Clauses 23-24, wherein the porous membrane has a bilayer structure comprising first and second layers, the first layer faces the first flow path and has a first pore size, and the second layer faces the second flow path and has a second pore size different than the first pore size.

Clause 26. The method of any clause or example herein, in particular Clause 25, wherein one of the first and second pore sizes is at least 1000 times greater than the other of the first and second pore sizes.

Clause 27. The method of any clause or example herein, in particular any one of Clauses 25-26, wherein one of the first and second pore sizes is greater than or equal to 1 $\mu$m and the other of the first and second pore sizes is less than or equal to 2 nm, for example, about 0.3 nm.

Clause 28. The method of any clause or example herein, in particular any one of Clauses 25-27, wherein one of the first and second layers has a thickness of 2 mm or less, and the other of the first and second layers has a thickness of 1 $\mu$m or less.

Clause 29. The method of any clause or example herein, in particular any one of Clauses 23-24, wherein the porous membrane comprises a single layer facing the first flow path on one side and the second flow path on an opposite side.

Clause 30. The method of any clause or example herein, in Clause 29, wherein the single layer has a pore size less than or equal to 10 nm.

Clause 31. The method of any clause or example herein, in particular any one of Clauses 29-30, wherein the pore size is less than or equal to 2 nm, for example, about 0.3 nm.

Clause 32. The method of any clause or example herein, in particular any one of Clauses 1-31, wherein the first heating element comprises multiple heating sub-elements electrically connected together, each heating sub-element being formed as a porous membrane that separates a respective first flow path from a common second flow path, the one or more reactants being provided to each first flow path, gaseous products of the one or more thermochemical reactions passing through the respective porous membrane to the common second flow path.

Clause 33. The method of any clause or example herein, in particular any one of Clauses 1-32, wherein the reactor has one or more second heating elements therein arranged in series or in parallel with the first heating element.

Clause 34. The method of any clause or example herein, in particular Clause 33, wherein (b), (c), or both comprise using one, some, or all of the second heating elements so as to provide a spatial temperature gradient, a temporal temperature gradient, or both.

Clause 35. The method of any clause or example herein, in particular any one of Clauses 1-34, wherein the one or more reactants comprise methane ($CH_4$), the one or more thermochemical reactions comprise pyrolysis, and a gaseous product of the thermochemical reactions comprises $C_2$ and higher hydrocarbons and/or aromatics.

Clause 36. The method of any clause or example herein, in particular Clause 35, wherein the thermochemical reactions within the reactor occur without a catalyst.

Clause 37. The method of any clause or example herein, in particular any one of Clauses 35-36, wherein at least 65% of the reacted methane is converted to $C_2$ hydrocarbons, or about 75% of the reacted methane is converted to $C_2$ hydrocarbons.

Clause 38. The method of any clause or example herein, in particular any one of Clauses 35-37, wherein the first temperature is at least 1200 K (e.g., 1800 K or greater), the duration of the first part of the heating cycle is less than 400 milliseconds (e.g., 100 ms or less), and the duration of the heating cycle is less than 1.5 seconds.

Clause 39. The method of any clause or example herein, in particular any one of Clauses 1-34, wherein the one or more reactants comprise nitrogen gas ($N_2$) and hydrogen gas ($H_2$), the one or more thermochemical reactions comprise synthesis, and a gaseous product of the thermochemical reactions comprises ammonia ($NH_3$).

Clause 40. The method of any clause or example herein, in particular Clause 39, wherein the first temperature is at least 1200 K, the duration of the first part of the heating cycle is less than 150 milliseconds, and the duration of the heating cycle is less than 1.5 seconds.

Clause 41. The method of any clause or example herein, in particular any one of Clauses 1-34, wherein the one or more reactants comprise a polymer, the one or more thermochemical reactions comprise pyrolysis and hydrogenation, and a product of the thermochemical reactions comprises monomers, oligomer, hydrocarbons, aromatics or any combination thereof.

Clause 42. The method of any clause or example herein, in particular any one of Clauses 1-34, wherein the one or more reactants comprises methane ($CH_4$) and nitrogen gas ($N_2$), the one or more thermochemical reactions comprise pyrolysis and synthesis, and a gaseous product of the thermochemical reactions comprises ammonia ($NH_3$), hydrocarbons, aromatics, or any combination thereof.

Clause 43. A method, comprising:

(a) for a first time period, providing one or more reactants within a reactor;

(b) during the first time period, using one or more Joule heating elements to change a temperature of the one or more reactants between a first peak temperature and a first minimum temperature for a first heating cycle, the first peak temperature initiating one or more thermochemical reactions of the one or more reactants; and (c) during the first time period, using the one or more Joule heating elements to change the temperature of the one or more reactants between a second peak temperature and a second minimum temperature for a second heating cycle, the second peak temperature initiating one or more thermochemical reactions of the one or more reactants, wherein a duration of the first time period is equal to or greater than a combined duration of the first and second heating cycles, the duration of each of the first heating cycle and the second heating cycle is less than five seconds, a difference between the first peak temperature and the first minimum temperature is at least 600

K, a difference between the second peak temperature and the second minimum temperature is at least 600 K, and the one or more thermochemical reactions comprises pyrolysis, thermolysis, synthesis, hydrogenation, dehydrogenation, hydrogenolysis, or any combination thereof.

Clause 44. The method of any clause or example herein, in particular Clause 43, further comprising, after (c) removing one or more gaseous products of the one or more thermochemical reactions from the reactor.

Clause 45. The method of any clause or example herein, in particular any one of Clauses 43-44, wherein (b) comprises applying a first electrical power waveform to the Joule heating elements, (c) comprises applying a second electrical power waveform to the Joule heating elements, the first electrical power waveform comprising a first electrical power level corresponding to the first peak temperature and a second electrical power level corresponding to the first minimum temperature, the second electrical power waveform comprising a third electrical power level corresponding to the second peak temperature and a fourth electrical power level corresponding to the second minimum temperature.

Clause 46. The method of any clause or example herein, in particular Clause 45, wherein each waveform has a pulse profile, a rectangular wave profile, a stepped profile, a triangular wave profile, a sine wave profile, or any combination thereof.

Clause 47. The method of any clause or example herein, in particular any one of Clauses 45-46, wherein the first and second electrical power waveforms are substantially identical, and a period of each electrical power waveform is a duration of each of the first and second heating cycles.

Clause 48. The method of any clause or example herein, in particular any one of Clauses 45-47, wherein a period of each of the first and second electrical power waveforms is 1-1.5 seconds, and a duration of the first peak temperature, the second peak temperature, or both is 10-400 milliseconds (e.g., 15-150 ms).

Clause 49. The method of any clause or example herein, in particular any one of Clauses 43-48, wherein:

the first peak temperature, the second peak temperature, or both is at least 1200 K;

the first minimum temperature, the second minimum temperature, or both is less than or equal to 800 K (e.g., less than or equal to 600 K); or any combination of the above.

Clause 50. The method of any clause or example herein, in particular any one of Clauses 43-49, wherein the one or more thermochemical reactions occur with the reactor at atmospheric pressure or at a pressure less than or equal to 20 MPa.

Clause 51. The method of any clause or example herein, in particular any one of Clauses 43-50, wherein:

for at least 65% of the duration of the first heating cycle, the one or more reactants are at a temperature less than the first peak temperature;

for at least 65% of the duration of the second heating cycle, the one or more reactants are at a temperature less than the second peak temperature; or any combination of the above.

Clause 52. The method of any clause or example herein, in particular any one of Clauses 43-51, wherein the one or more thermochemical reactions proceed within the reactor without a catalyst.

Clause 53. The method of any clause or example herein, in particular any one of Clauses 43-51, wherein the reactor, the one or more Joule heating elements, or both include one or more catalysts.

Clause 54. The method of any clause or example herein, in particular any one of Clauses 43-53, wherein:

each Joule heating element has a porous construction that allows gas to flow therethrough;

each Joule heating element is formed of pure carbon or carbon-containing material;

each Joule heating element has a heat capacity of less than $1 \times 10^{-5}$ J/K;

each Joule heating element is constructed and controlled to provide a heating rate, a cooling rate, or both of at least $10^3$ K/s; or any combination of the above.

Clause 55. The method of any clause or example herein, in particular any one of Clauses 43-54, wherein each Joule heating element is constructed as a porous separation membrane that allows at least one of the reactants or gaseous products to pass therethrough while retaining the other of the reactants or gaseous products.

Clause 56. A thermochemical reaction system, comprising:

a gas-flow reactor having an inlet port and an outlet port, the inlet port being constructed to receive input of a gas flow to an internal volume of the gas-flow reactor, the outlet port being constructed to receive output of a gas flow from the internal volume of the gas-flow reactor;

a Joule heating element disposed within the gas-flow reactor, the Joule heating element having a porous construction that allows gas to flow therethrough; and a control system operatively coupled to the Joule heating element and configured to apply a signal to the Joule heating element that changes temperature thereof between a peak temperature and a minimum temperature during a corresponding heating cycle, wherein a duration of the heating cycle is less than five seconds, a difference between the peak temperature and the minimum temperature is at least 600 K, and the peak temperature is at least 1200 K.

Clause 57. The thermochemical reaction system of any clause or example herein, in particular Clause 56, wherein the control system is configured to repeat the heating cycle by re-applying the signal to the Joule heating element.

Clause 58. The thermochemical reaction system of any clause or example herein, in particular any one of Clauses 56-57, wherein the control system comprises one or more processors, and computer-readable storage media storing computer-readable instructions that, when executed by the one or more processors, cause the one or more processors to apply the signal and/or re-apply the signal to the Joule heating element.

Clause 59. The thermochemical reaction system of any clause or example herein, in particular any one of Clauses 56-58, wherein each signal comprises an electrical power waveform having at least a first electrical power level corresponding to the peak temperature and a second electrical power level corresponding to the minimum temperature.

Clause 60. The thermochemical reaction system of any clause or example herein, in particular any one of Clauses 56-59, wherein each signal comprises an electrical power waveform having a pulse profile, rectangular wave profile, stepped profile, triangular wave profile, sine wave profile, or any combination thereof.

Clause 61. The thermochemical reaction system of any clause or example herein, in particular any one of Clauses 56-60, wherein the control system is configured to apply the signal or re-apply the signal such that the duration of the respective heating cycle is 1-1.5 seconds, a duration of the peak temperature is 10-400 milliseconds (e.g., 15-150 ms), or both.

Clause 62. The thermochemical reaction system of any clause or example herein, in particular any one of Clauses 56-61, wherein the control system is configured to apply the signal or re-apply the signal such that the peak temperature is applied for no more than 35% of the duration of the respective heating cycle.

Clause 63. The thermochemical reaction system of any clause or example herein, in particular any one of Clauses 56-62, wherein:

the Joule heating element is formed of pure carbon or carbon-containing material;

the Joule heating element has a heat capacity of less than $1 \times 10^{-5}$ J/K;

the Joule heating element is constructed and controlled to provide a heating rate, a cooling rate, or both of at least 103 K/s; or any combination of the above.

Clause 64. The thermochemical reaction system of any clause or example herein, in particular any one of Clauses 56-63, wherein the Joule heating element comprises porous carbon or porous silicon carbide (SiC).

Clause 65. The thermochemical reaction system of any clause or example herein, in particular any one of Clauses 56-64, wherein the gas-flow reactor, the Joule heating element, or both include one or more catalysts.

Clause 66. The thermochemical reaction system of any clause or example herein, in particular Clause 65, wherein the one or more catalysts comprise single element nanoparticles, multi-element nanoparticles, or any combination thereof.

Clause 67. The thermochemical reaction system of any clause or example herein, in particular any one of Clauses 56-66, wherein gas-flow reactor is provided with multiple Joule heating elements arranged in series or in parallel with respect to a gas flow through the internal volume of the gas-flow reactor.

Clause 68. The thermochemical reaction system of any clause or example herein, in particular any one of Clauses 56-67, further comprising a separator constructed to separate gaseous products of a thermochemical reaction within the internal volume of the gas flow reactor from reactants of the thermochemical reaction.

Clause 69. The thermochemical reaction system of any clause or example herein, in particular any one of Clauses 56-68, wherein the Joule heating element is constructed as a porous separation membrane that allows a first gas to pass therethrough while retaining a second gas.

Clause 70. The thermochemical reaction system of any clause or example herein, in particular Clause 69, wherein the porous separation membrane has a bilayer structure comprising first and second layers, the first layer having a first pore size, the second layer having a second pore size different than the first pore size.

Clause 71. The thermochemical reaction system of any clause or example herein, in particular Clause 70, wherein:

one of the first and second pore sizes is at least 1000 times greater than the other of the first and second pore sizes;

one of the first and second pore sizes is greater than or equal to 1 μm and the other of the first and second pore sizes is less than or equal to 2 nm, for example, about 0.3 nm;

one of the first and second layers has a thickness of 2 mm or less, and the other of the first and second layers has a thickness of 1 μm or less; or any combination of the above.

Clause 72. The thermochemical reaction system of any clause or example herein, in particular Clause 69, wherein the porous separation membrane is a single layer that is substantially homogeneous throughout its thickness.

Clause 73. The thermochemical reaction system of any clause or example herein, in particular Clause 72, wherein the single layer has a pore size less than or equal to 10 nm.

Clause 74. The thermochemical reaction system of any clause or example herein, in particular Clause 73, wherein the pore size is less than or equal to 2 nm, for example, about 0.3 nm.

Clause 75. The thermochemical reaction system of any clause or example herein, in particular any one of Clauses 56-74, wherein the gas-flow reactor comprises a thermally-stable holder disposed proximal to the Joule heating element, the thermally-stable holder being constructed to hold solid or liquid reactants for heating during each heating cycle.

Clause 76. The thermochemical reaction system of any clause or example herein, in particular Clause 75, wherein the thermally-stable holder comprises quartz, ceramic, or any combination thereof.

Clause 77. A thermochemical reaction system, comprising:

an array of membrane reactors arranged in parallel, each membrane reactor comprising a circumferential membrane wall that surrounds an internal flow volume, the circumferential membrane wall being constructed to allow a first gas from the internal flow volume to pass therethrough while retaining a second gas within the internal flow volume;

an outer conduit containing the array of membrane reactors, the outer conduit defining a product collection flow volume between outer circumferential surfaces of the membrane walls and an inner circumferential surface of the outer conduit; and electrical connections to each of the array of membrane reactors, the electrical connections being constructed to allow application of electrical power thereto, such that each membrane wall acts as a Joule heating element.

Clause 78. The thermochemical reaction system of any clause or example herein, in particular Clause 77, further comprising:

a control system operatively coupled to the membrane reactors via said electrical connections, the control system being configured to apply an electrical power signal to each membrane wall that changes temperature thereof between a peak temperature and a minimum temperature during a corresponding heating cycle, wherein a duration of the heating cycle is less than five seconds, a difference between the peak temperature and the minimum temperature is at least 600 K, and the peak temperature is at least 1200 K.

Clause 79. The thermochemical reaction system of any clause or example herein, in particular Clause 78, wherein the control system is configured to repeat the heating cycle by re-applying the electrical power signal to each membrane wall.

Clause 80. The thermochemical reaction system of any clause or example herein, in particular any one of Clauses 78-79, wherein the control system comprises one or more processors, and computer-readable storage media storing computer-readable instructions that, when executed by the one or more processors, cause the one or more processors to apply the electrical power signal and/or re-apply electrical power signal to each membrane wall.

Clause 81. The thermochemical reaction system of any clause or example herein, in particular any one of Clauses 77-80, wherein each electrical power signal comprises a waveform having at least a first power level corresponding to the peak temperature and a second power level corresponding to the minimum temperature.

Clause 82. The thermochemical reaction system of any clause or example herein, in particular any one of Clauses 77-81, wherein each electrical power signal comprises a waveform having a pulse profile, rectangular wave profile, stepped profile, triangular wave profile, sine wave profile, or any combination thereof.

Clause 83. The thermochemical reaction system of any clause or example herein, in particular any one of Clauses 78-82, wherein the control system is configured to apply the electrical power signal or re-apply the electrical power signal such that the duration of the respective heating cycle is 1-1.5 seconds, a duration of the peak temperature is 10-400 milliseconds (e.g., 15-150 ms), or both.

Clause 84. The thermochemical reaction system of any clause or example herein, in particular any one of Clauses 78-83, wherein the control system is configured to apply the electrical power signal or re-apply the electrical power signal such that the peak temperature is applied for no more than 35% of the duration of the respective heating cycle.

Clause 85. The thermochemical reaction system of any clause or example herein, in particular any one of Clauses 77-84, wherein:

each membrane wall is formed of pure carbon or carbon-containing material;

each membrane wall has a heat capacity of less than $1\times10^{-5}$ J/K;

each membrane wall is constructed and controlled to provide a heating rate, a cooling rate, or both of at least $10^3$ K/s; or any combination of the above.

Clause 86. The thermochemical reaction system of any clause or example herein, in particular any one of Clauses 77-85, wherein each membrane wall comprises porous carbon or porous silicon carbide (SiC).

Clause 87. The thermochemical reaction system of any clause or example herein, in particular any one of Clauses 77-86, wherein each membrane reactor includes one or more catalysts.

Clause 88. The thermochemical reaction system of any clause or example herein, in particular Clause 87, wherein the one or more catalysts comprise single element nanoparticles, multi-element nanoparticles, or any combination thereof.

Clause 89. The thermochemical reaction system of any clause or example herein, in particular any one of Clauses 77-88, further comprising:

a first inlet manifold that directs an inlet of gaseous reactants to the internal flow volume of each of the membrane reactors;

a first outlet manifold that collects unreacted gaseous reactants exiting the internal flow volume of each of the membrane reactors;

a second inlet manifold that directs an inlet of carrier or sweep gas to the product collection flow volume surrounding the membrane reactors;

a second outlet manifold that collects carrier gas, sweep gas, gaseous products, or any combination thereof exiting from the product collection flow volume; or any combination of the above.

Clause 90. The thermochemical reaction system of any clause or example herein, in particular any one of Clauses 77-89, further comprising:

a first fluid circuit loop that couples an outlet of the first outlet manifold to an inlet of the first inlet manifold so as to recirculate reactants to the membrane reactors;

a second fluid circuit loop that couples an outlet of the second outlet manifold to an inlet of the first inlet manifold, the second inlet manifold, or both, so as to recirculate carrier or sweep gas to the membrane reactors or to reuse the carrier or sweep gas as a reactant; or any combination of the above.

Clause 91. The thermochemical reaction system of any clause or example herein, in particular any one of Clauses 77-90, wherein the first fluid circuit loop comprises a heat exchanger constructed to remove heat from the recirculated reactants;

the second fluid circuit loop comprises a heat exchanger constructed to remove heat from an outlet flow from the second outlet manifold so as to separate or condense a gaseous product in the outlet flow;

the first fluid circuit loop, the second fluid circuit loop, or both comprise an electricity generator constructed to use the removed heat to generate electricity; or any combination of the above.

Clause 92. The thermochemical reaction system of any clause or example herein, in particular any one of Clauses 77-91, further comprising:

a hydrogen gas source and a nitrogen gas source, wherein each gas source is coupled to the array of membrane reactors to provide the respective gas as input to the internal flow volumes of the membrane reactors, the membrane reactors are constructed to discontinuously heat the hydrogen and nitrogen gases flowing within the internal flow volumes to cause a thermochemical reaction of the gases to produce ammonia.

Clause 93. The thermochemical reaction system of any clause or example herein, in particular any one of Clauses 77-91, further comprising:

a source of first hydrocarbon gas, wherein the source is coupled to the array of membrane reactors to provide the first hydrocarbon gas as input to the internal flow volumes of the membrane reactors, the membrane reactors are constructed to discontinuously heat the first hydrocarbon gas flowing within the internal flow volumes to cause a thermochemical reaction of the first hydrocarbon gas to cause transformation thereof to other hydrocarbons and/or aromatics.

Clause 94. The thermochemical reaction system of any clause or example herein, in particular any one of Clauses 77-91, further comprising:

a methane gas source and a nitrogen gas source, wherein each gas source is coupled to the array of membrane reactors to provide the respective gas as input to the internal flow volumes of the membrane reactors, the membrane reactors are constructed to discontinuously heat the methane and nitrogen gases flowing within the internal flow volumes to cause thermochemical reactions of the gases to produce ammonia, hydrocarbons, aromatics, or any combination thereof.

Clause 95. The thermochemical reaction system of any clause or example herein, in particular any one of Clauses 77-91, further comprising:

a methane gas source and a carbon dioxide gas source, wherein each gas source is coupled to the array of membrane reactors to provide the respective gas as input to the internal flow volumes of the membrane reactors, the membrane reactors are constructed to discontinuously heat the methane and carbon dioxide gases flowing within the internal flow volumes to cause a thermochemical reaction of the gases to produce syngas.

Clause 96. The thermochemical reaction system of any clause or example herein, in particular any one of Clauses 77-91, further comprising:

a source of hydrogen gas with particles or droplets of a polymer therein, wherein the source is coupled to the array of membrane reactors to provide the hydrogen gas with the particles or droplets as input to the internal flow volumes of the membrane reactors, the membrane reactors are constructed to discontinuously heat the particles or droplets in the hydrogen gas flowing within the internal flow volumes to cause a thermochemical reaction of the polymer to produce monomers, oligomers, hydrocarbons, aromatics, or any combination thereof.

CONCLUSION

Any of the features illustrated or described with respect to FIGS. 1A-16D can be combined with any other features illustrated or described with respect to FIGS. 1A-16D to provide systems, methods, devices, and embodiments not otherwise illustrated or specifically described herein. For example, the heating element configurations described with respect to FIGS. 6A-10B can be applied to any of the reactor operations described with respect to FIGS. 2A-4B. Moreover, the heating element arrangement variations described with respect to FIGS. 6B-6D can be applied to the heating element configurations described with respect to FIGS. 7A-10B, and vice versa. In still another example, the system configuration illustrated in FIG. 11 could be applied to other thermochemical reaction processes besides ammonia production. Other combinations and variations are also possible according to one or more contemplated embodiments. Indeed, all features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:

1. A method, comprising:

(a) for a first time period, providing one or more reactants in thermal contact with a first heating element in a reactor;

(b) during a first part of a heating cycle, providing the one or more reactants with a first temperature by heating with the first heating element, such that one or more thermochemical reactions is initiated; and (c) during a second part of the heating cycle, providing the one or more reactants with a second temperature less than the first temperature, wherein a duration of the first time period is equal to or greater than a combined duration of the first and second parts of the heating cycle, the combined duration of the first and second parts of the heating cycle is less than five seconds, the first heating element operates by Joule heating and has a porous construction that allows gas to flow therethrough, the one or more thermochemical reactions comprises pyrolysis, thermolysis, synthesis, hydrogenation, dehydrogenation, hydrogenolysis, or any combination thereof, the second temperature is at least 600 K less than the first temperature, the first temperature is greater than or equal to 1200 K, and the second temperature is less than or equal to 800 K.

2. The method of claim 1, wherein the second part of the heating cycle immediately follows the first part of the heating cycle, a duration of the first part is 10-400 milliseconds, and/or a duration of the second part is 1-1.5 seconds.

3. The method of claim 1, wherein the one or more thermochemical reactions occur with the reactor at atmospheric pressure or at a pressure less than or equal to 20 MPa.

4. The method of claim 1, wherein (a) comprises recirculating reactants unreacted by a previous heating cycle back into thermal contact with the first heating element, and the method further comprises: (d) repeating (b)-(c).

5. The method of claim 1, wherein:

the reactor, the first heating element, or both the reactor and the first heating element include one or more catalysts, and the one or more catalysts comprise single element nanoparticles, multi-element nanoparticles, or any combination thereof.

6. The method of claim 1, wherein the first heating element comprises a pure carbon or carbon-containing material.

7. The method of claim 1, wherein the first heating element is formed as a porous membrane that allows at least one gaseous product of the one or more thermochemical reactions to pass therethrough to a second flow path while retaining the one or more reactants in a first flow path.

8. The method of claim 1, wherein the first heating element is formed as a porous membrane that allows the one or more reactants to pass therethrough to a second flow path while retaining at least one gaseous product of the one or more thermochemical reactions in a first flow path.

9. The method of claim 1, wherein:

the one or more reactants comprise methane ($CH_4$), the one or more thermochemical reactions comprise pyrolysis, and a gaseous product of the thermochemical reactions comprises $C_2$ and higher hydrocarbons and/or aromatics, and the thermochemical reactions within the reactor occur without a catalyst.

10. The method of claim 1, wherein the one or more reactants comprise nitrogen gas ($N_2$) and hydrogen gas ($H_2$), the one or more thermochemical reactions comprise synthesis, and a gaseous product of the thermochemical reactions comprises ammonia ($NH_3$).

11. The method of claim 1, wherein the one or more reactants comprise a polymer, the one or more thermochemical reactions comprise pyrolysis and hydrogenation, and a product of the thermochemical reactions comprises monomers, oligomer, hydrocarbons, aromatics, or any combination thereof.

12. The method of claim 1, wherein the one or more reactants comprises methane ($CH_4$) and nitrogen gas ($N_2$), the one or more thermochemical reactions comprise pyrolysis and synthesis, and a gaseous product of the thermochemical reactions comprises ammonia ($NH_3$).

13. The method of claim 1, wherein:
the providing of (a) comprises flowing a gas into the reactor such that the one or more reactants in the flow of gas are in thermal contact with the first heating element in the reactor;
during (a) and (b), the one or more reactants are in a gas phase; and
the method further comprises removing one or more gaseous products of the one or more thermochemical reactions from the reactor.

14. The method of claim 1, wherein a heating rate to the first temperature is at least $10^3$ K/s, or a cooling rate to the second temperature is at least $10^3$ K/s.

15. A method, comprising:
(a) for a first time period, providing one or more reactants in thermal contact with a first heating element in a reactor;
(b) during a first part of a heating cycle, providing the one or more reactants with a first temperature by heating with the first heating element, such that one or more thermochemical reactions is initiated; and
(c) during a second part of the heating cycle, providing the one or more reactants with a second temperature less than the first temperature,
wherein a duration of the first time period is equal to or greater than a combined duration of the first and second parts of the heating cycle,
the combined duration of the first and second parts of the heating cycle is less than five seconds,
the first heating element operates by Joule heating and has a porous construction that allows gas to flow therethrough,
the one or more thermochemical reactions comprises pyrolysis, thermolysis, synthesis, hydrogenation, dehydrogenation, hydrogenolysis, or any combination thereof,
(b) and (c) comprise applying an electrical power waveform to the first heating element, the waveform comprising at least a first electrical power level corresponding to the first temperature and a second electrical power level corresponding to the second temperature; and the waveform comprises a pulse, a rectangular wave profile, a stepped profile, a triangular wave profile, a sine wave profile, or any combination thereof.

16. The method of claim 15, wherein:
the second temperature is at least 600 K less than the first temperature,
the first temperature is greater than or equal to 1200 K, and
the second temperature is less than or equal to 800 K.

17. The method of claim 15, wherein the second part of the heating cycle immediately follows the first part of the heating cycle, a duration of the first part is 10-400 milliseconds, and/or a duration of the second part is 1-1.5 seconds.

18. The method of claim 15, wherein:
the first heating element is formed as a porous membrane that allows one or more gaseous products of the one or more thermochemical reactions to pass therethrough to a second flow path while retaining the one or more reactants in a first flow path; or
the first heating element is formed as a porous membrane that allows the one or more reactants to pass therethrough to a second flow path while retaining one or more gaseous products of the one or more thermochemical reactions in a first flow path.

19. A method, comprising:
(a) for a first time period, providing one or more reactants in thermal contact with a first heating element in a reactor;
(b) during a first part of a heating cycle, providing the one or more reactants with a first temperature by heating with the first heating element, such that one or more thermochemical reactions is initiated; and
(c) during a second part of the heating cycle, providing the one or more reactants with a second temperature less than the first temperature,
wherein a duration of the first time period is equal to or greater than a combined duration of the first and second parts of the heating cycle,
the combined duration of the first and second parts of the heating cycle is less than five seconds,
the first heating element operates by Joule heating and has a porous construction that allows gas to flow therethrough,
the one or more thermochemical reactions comprises pyrolysis, thermolysis, synthesis, hydrogenation, dehydrogenation, hydrogenolysis, or any combination thereof, and
the first heating element is formed as a porous membrane that allows one of a gaseous product and a reactant to pass therethrough to a second flow path while retaining the other of the gaseous product and the reactant in a first flow path.

20. The method of claim 19, wherein the porous membrane has a bilayer structure comprising first and second layers, the first layer faces the first flow path and has a first pore size, and the second layer faces the second flow path and has a second pore size different than the first pore size.

* * * * *